US010872031B2

(12) United States Patent
Ross

(10) Patent No.: US 10,872,031 B2
(45) Date of Patent: Dec. 22, 2020

(54) PROCESSING DATA STREAMS RECEIVED FROM INSTRUMENTED SOFTWARE IN REAL TIME USING INCREMENTAL-DECREMENTAL IMPLEMENTATION OF THE KPSS STATIONARITY STATISTIC

(71) Applicant: Splunk Inc., San Francisco, CA (US)

(72) Inventor: Joseph Ari Ross, Redwood City, CA (US)

(73) Assignee: Splunk Inc., San Francisco, CA (US)

( * ) Notice: Subject to any disclaimer, the term of this patent is extended or adjusted under 35 U.S.C. 154(b) by 0 days.

(21) Appl. No.: 16/265,218

(22) Filed: Feb. 1, 2019

(65) Prior Publication Data

US 2019/0243747 A1    Aug. 8, 2019

Related U.S. Application Data

(60) Provisional application No. 62/627,132, filed on Feb. 6, 2018.

(51) Int. Cl.
*G06F 11/36* (2006.01)
*G06F 11/34* (2006.01)
(Continued)

(52) U.S. Cl.
CPC ...... *G06F 11/3644* (2013.01); *G06F 11/3419* (2013.01); *G06F 11/3452* (2013.01);
(Continued)

(58) Field of Classification Search
CPC .......................... G06F 11/3644; G06F 11/3419
(Continued)

(56) References Cited

U.S. PATENT DOCUMENTS 6,763,444 B2 *   7/2004   Thomann .................. G11C 7/22
                                                          702/89
7,310,590 B1 *  12/2007   Bansal ................. G06F 11/0715
                                                         702/181
(Continued)

OTHER PUBLICATIONS

Gross, Kenny C., et al. "Towards dependability in everyday software using software telemetry." Third IEEE International Workshop on Engineering of Autonomic & Autonomous Systems (EASE'06). IEEE, 2006.pp. 154-163 (Year: 2006).*

(Continued)

*Primary Examiner* — Satish Rampuria
(74) *Attorney, Agent, or Firm* — McDermott Will & Emery LLP

(57) ABSTRACT

An analysis system receives a time series. The data values of the time series correspond to a metric describing a characteristic of the computing system that changes over time. The analysis system stores a statistic value that represents the stationarity of the time series. In response to receiving a most recent value, the analysis system assigns the most recent value as the leading value in a window before retrieving the trailing value of the window. The analysis system updates the statistic value to add an influence of the most recent value and remove an influence of the trailing value. If the statistic value is less than a threshold, the analysis system determines that the time series is stationary. In response to determining the time series is stationary, the analysis system assigns an alert to the metric. The analysis system detects an anomaly in the metric based on the assigned alert.

18 Claims, 13 Drawing Sheets

(51) Int. Cl.
  *G06F 17/18* (2006.01)
  *G06F 17/11* (2006.01)
(52) U.S. Cl.
  CPC .............. *G06F 17/11* (2013.01); *G06F 17/18* (2013.01); *G06F 2201/81* (2013.01); *G06F 2201/865* (2013.01)
(58) Field of Classification Search
  USPC ................................................. 717/124–135
  See application file for complete search history.

(56) References Cited

U.S. PATENT DOCUMENTS

| 7,739,667 | B2* | 6/2010 | Callahan, II | G06F 11/3404 717/127 |
|---|---|---|---|---|
| 10,181,948 | B1* | 1/2019 | Nenov | G06F 8/65 |
| 10,514,905 | B1* | 12/2019 | Montgomery | G06F 21/57 |
| 2003/0023719 | A1* | 1/2003 | Castelli | H04L 41/00 709/224 |
| 2011/0289493 | A1* | 11/2011 | Keefe | G06F 8/65 717/168 |
| 2016/0103665 | A1 | 4/2016 | Liu et al. | |
| 2016/0103757 | A1* | 4/2016 | Liu | G06F 11/3082 717/130 |
| 2019/0008722 | A1 | 3/2019 | Lospinoso et al. | |

OTHER PUBLICATIONS

Robinson, William N. "Monitoring software requirements using instrumented code." Proceedings of the 35th Annual Hawaii International Conference on System Sciences. IEEE, 2002.pp. 1-10 (Year: 2002).*

Bhansali, Sanjay, et al. "Framework for instruction-level tracing and analysis of program executions." Proceedings of the 2nd international conference on Virtual execution environments. 2006.pp. 1-10 (Year: 2006).*

Johnson, Philip M., et al. "Experiences with CSRS: An instrumented software review environment." Proceedings of the Pacific Northwest Software Quality Conference. 1993.pp. 1-17 (Year: 1993).*

Kalsing, Andre Cristiano, et al. "An incremental process mining approach to extract knowledge from legacy systems." 2010 14th IEEE International Enterprise Distributed Object Computing Conference. IEEE, 2010.pp. 79-88 (Year: 2010).*

Magalhães, Claudio, et al. "Evaluating an automatic text-based test case selection using a non-instrumented code coverage analysis." Proceedings of the 2nd Brazilian Symposium on Systematic and Automated Software Testing. 2017.pp. 1-9 (Year: 2017).*

Thommandram, Anirudh, et al. "Classifying neonatal spells using real-time temporal analysis of physiological data streams: Algorithm development." 2013 IEEE Point-of-Care Healthcare Technologies (PHT). IEEE, 2013. pp. 240-243 (Year: 2013).*

Curry, Chris, et al. "Detecting changes in large data sets of payment card data: a case study." Proceedings of the 13th ACM SIGKDD international conference on Knowledge discovery and data mining. 2007. pp. 1018-1022 (Year: 2007).*

Hofmann, Alexander, and Bernhard Sick. "Online intrusion alert aggregation with generative data stream modeling." IEEE transactions on dependable and secure computing 8.2 (2009): pp. 282-294. (Year: 2009).*

Kwiatkowski, D. et al., "Testing the null hypothesis of stationarity against the alternative of a unit root," Journal of Econometrics 54, 1992, pp. 159-178.

* cited by examiner

US 10,872,031 B2

PROCESSING DATA STREAMS RECEIVED FROM INSTRUMENTED SOFTWARE IN REAL TIME USING INCREMENTAL-DECREMENTAL IMPLEMENTATION OF THE KPSS STATIONARITY STATISTIC

CROSS REFERENCE TO RELATED APPLICATIONS

This application claims the benefit of U.S. Provisional Application No. 62/627,132, filed on Feb. 6, 2018, which is incorporated herein by reference.

BACKGROUND

This disclosure relates to generating alerts for data streams and more specifically to determining stationarity of data streams received from instrumented software using a statistic value computed for a rolling window.

Software developers monitor different aspects of software they develop by instrumenting the software. These include performance of the software, errors encountered during execution of the software, significant events encountered during execution of the software, information describing which parts of code are being executed and which parts are not being executed, and so on. These aspects can be analyzed by observing the behavior of data streams related to the software. In particular, data streams may include signals that represent various resources within a system using the software. In the case of an anomaly with the signal, such as a resource running out of space or failing to report, the system may alert a user of the system that an anomaly was detected.

Alert conditions within a system that monitors instrumented software may differ based on whether a signal is expected to be stationary over time. A signal is typically considered stationary around a level if the distribution of its values does not change over time, but stays in the neighborhood a constant value. In contrast, a signal is considered stationary around a trend if the signal does not vary from a simple linear trend over time. The stationarity of a signal has implications for choosing the correct alerting schemes. For example, if a signal is stationary, a sudden change alert may be used. In a sudden change alert, the system compares current values of a signal to recent values from the signal, and alerts the developer if a sudden change in the signal level is detected. By contrast, for non-stationary signals, such as signals that display seasonality, a historical anomaly alert may be used. In a historical anomaly alert, the system compares the current values of the signal to historical values of the signal, stored further back in time than the recent values. If software developers choose incorrectly between these types of alerts, e.g., using a non-stationary alert for a stationary signal, or vice versa, the system may generate unnecessary alerts, or miss concerning signal behavior, leading to lack of data collection or system failure that could have been prevented.

SUMMARY

To provide more reliable alerting for real-time data signals of instrumented software, a statistical test for level-stationarity and trend-stationarity, known as the Kwiatkowski-Phillips-Schmidt-Shin (KPSS) statistic, is used to analyze and categorize the data signals. The method of calculating the KPSS statistic described herein is a compact method for determining stationarity of a time series over a rolling window. The calculated KPSS statistics are used to guide the selection of an anomaly detection method in the monitoring the health of computing infrastructure. The value of the KPSS statistic may be used to determine which alert condition, e.g., between a sudden change alert and a historical anomaly alert, would be most useful for a particular signal.

The KPSS statistic represents normalized partial sums of residual values, and may be implemented in various ways to determine two types of stationarity: trend-stationarity and level-stationarity. A time series has trend-stationarity if the time series is stationary around a simple linear trend. To determine trend-stationarity, the statistic is based on the mathematical model $y_t = \alpha t + r_t + \varepsilon_t$, where $r_t$ is a random walk $(r_t = r_{t-1} + u_t)$ and $\varepsilon_t$ is the stationary error. Both $u_t$ and $\varepsilon_t$ are assumed to have a mean zero. A time series has level-stationarity if the time series is stationary around a mean of the time series. To determine level-stationarity, the term $\alpha t$ is omitted from the mathematical model used for trend-stationarity. For both level-stationarity and trend-stationarity, the KPSS statistic tests the hypothesis that the variance of the $u_t$'s is zero using the Lagrange multiplier statistic, which means that the series will differ only noisily from the level $r = r_1 = \ldots = r_n$.

The instrumentation analysis system described herein computes the KPSS statistic for a time series on a rolling window of data. In a typical implementation of the KPSS statistic, the mean p of the time series $x_1 \ldots x_n$ is used to calculate residual values $e_1 = x_1 - \mu \ldots e_n = x_2 - \mu$. Partial sums of the residual values $s_1 = e_1$, $s_2 = e_1 + e_2$, $s_n = e_1 + e_2 + \ldots + e_n$ are used to calculate the KPSS statistic $s_1^2 + s_2^2 + \ldots + s_n^2$, which is a sum of the squared residuals. However, each time a new data value is added to the time series, the residual values need to be recalculated anew to calculate the value of the KPSS statistic based on the new data value. This process of calculating the KPSS statistic is time and resource intensive, making it not suitable for real-time data analysis. The incremental-decremental implementation described herein for calculating the KPSS statistic on a rolling window, where the window of the time series shifts as new points are added, is more efficient and allowed the KPSS statistic to be used for real-time data analysis.

As described herein, for a rolling window of size n, the rolling window framework includes a priming phase, when the first n points are added to the window, followed by a streaming phase, during which new data is added and old data is discarded to maintain size n of the window. This is known as incrementing and decrementing, respectively. Computing the KPSS statistic on the rolling window allows for the influence of new points to be incorporated into the statistic, while the influence of old points is removed from the statistic. This is more efficient for real-time data analysis because significantly fewer computations are needed each time a new data point is received for the time series compared to standard methods for calculating the KPSS statistic. Less computation is particularly useful in systems that receive large quantities of data quickly as it dramatically improves efficiency in the system.

One embodiment relates to a method for anomaly detection in a metric for a computing system. An instrumentation analysis system receives a time series comprising a plurality of data values from an instance of instrumented software executing on an external computing system. Each of the plurality of data values corresponds to a metric that describes a characteristic of the computing system that changes over time. The instrumentation analysis system stores a statistic value representing a current stationarity of the times series based on data values of the plurality of data values for the time series in a window. The window has a leading value and a trailing value, and the statistic value is computed based on normalized partial sums of residual values. In response to receiving a most recent value of the plurality of data values in the time series, the instrumentation analysis system assigns the most recent value as the leading value in the window, retrieves the trailing value of the window, and updates the statistic value to add an influence of the most recent value and remove an influence of the trailing value. In response to the statistic value being less than a threshold, the instrumentation analysis system determines that the time series is stationary. In response to determining that the time series is stationary, the instrumentation analysis system assigns an alert for a stationary data stream to the metric. The analysis detects an anomaly in the metric based on the assigned alert.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

DETAILED DESCRIPTION

Overall System Environment

Figure 1:
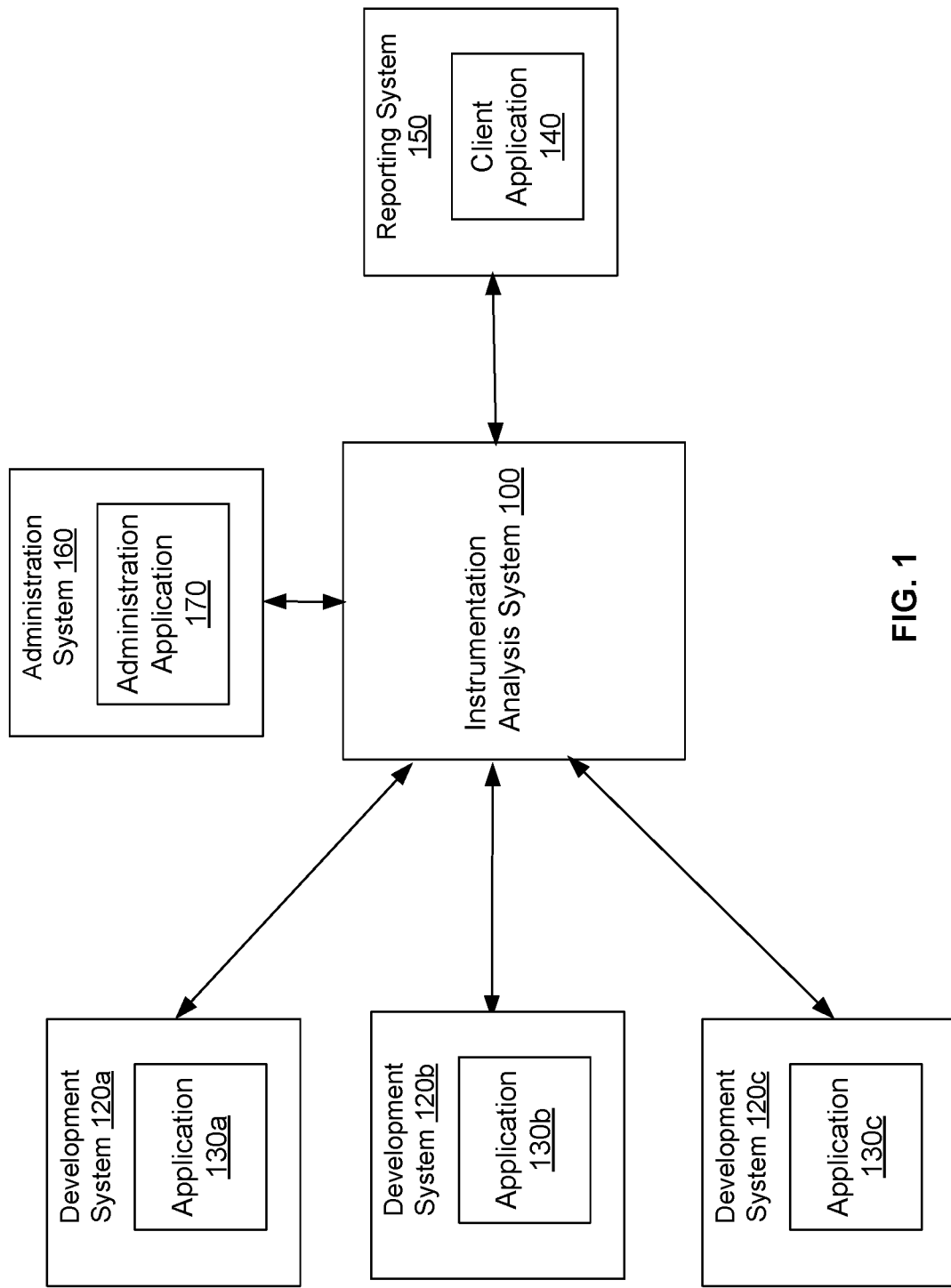
FIG. 1 shows the overall system environment for reporting based on instrumented software, according to an embodiment.

FIG. 1 shows the overall system environment for reporting based on instrumented software, according to an embodiment. The overall system environment includes an instrumentation analysis system 100, one or more development systems 120, an administration system 160, and a reporting system 150. In other embodiments, more or less components than those indicated in FIG. 1 may be used. For example, development system 120, administration system 160, and reporting system 150 may interact with instrumentation analysis system 100 via a network (not shown in FIG. 1). Furthermore, there may be more or less instances of each system shown in FIG. 1, for example, there may be multiple reporting systems 150.

FIG. 1 and the other figures use like reference numerals to identify like elements. A letter after a reference numeral, such as "130a," indicates that the text refers specifically to the element having that particular reference numeral. A reference numeral in the text without a following letter, such as "130," refers to any or all of the elements in the figures bearing that reference numeral (e.g. "130" in the text refers to reference numerals "130a" and/or "130b" in the figures).

The instrumentation analysis system 100 receives data comprising values of metrics sent by different development systems 120 (the instrumentation analysis system 100 may also be referred to herein as an analysis system or a data analysis system). A development system 120 executes instrumented software, for example, application 130. Although, application 130 is shown in FIG. 1 as an example of instrumented software, the techniques disclosed herein are not limited to application software but are applicable to other kinds of software, for example, server software, software executing on client devices, websites, and so on. Furthermore, a development system 120 comprises any computing system that is configured to execute instrumented software, whether or not it is used for development of new software. For example, the development system 120 may be a computing system used for testing purposes, staging purposes, or any production system executing in an enterprise.

The software executing on a development system 120 is configured to send information generated as a result of instrumenting the software to instrumentation analysis system 100. For example, the application 130 may send values corresponding to various metrics as they are generated to instrumentation analysis system 100. The application 130 may send group values of metrics and send them periodically to instrumentation analysis system 100. Different applications 130 may send the same metric or different metrics at different rates. The same application may send different metrics at different rates. The application 130 sends data to the instrumentation analysis system 100 by invoking application programming interface (API) supported by the instrumentation analysis system 100.

A software program may be instrumented to add counters or gauges to the application. A counter comprises instructions that store a value that is incremented upon occurrence of certain event in the software. The counter may be used to determine the number of times a particular part of the code is executed, for example, a function or a method, a particular branch of a conditional code, an exception, a loop, and so on.

Typically a counter value changes monotonically, for example, a counter value may increase (or decrease) monotonically. For example, if the counter tracks the number of times an event has occurred since the system started execution, the counter value increases each time the occurrence of the event is detected by the system. Values of a counter may be compared to determine the change in the particular counter value at two different points in time. For example, the number of times a particular event occurs within a time interval between times t1 and t2 may be determined by computing the change in a corresponding counter value from t1 to t2. The APIs of the instrumentation analysis system may be invoked by the application 130 to send the current value of the counter to the instrumentation analysis system 100.

Following is an example of instrumented code of an application 130. The following instruction included in the code being instrumented creates a counter object for tracking count of an action or entities.

counter1=createCounter(source="web1", metric="metric1");

The above instruction creates a counter object and assigns it to the variable counter1. The counter object is associated with a source "web1" and metric "metric1." In an embodiment, the source and the metric values uniquely identify the data stream associated with the counter (or a gauge). In other embodiments, more or fewer key value pairs may be used to uniquely identify a data stream.

One or more of the values specified during creation of a counter are received when data corresponding to the counter is sent by the instrumented code to the instrumentation analysis system 100. Embodiments allow the application 130 to be instrumented so as to reduce the amount of information sent with each data stream. This reduces the amount of overhead introduced in the application 130 as a result of instrumenting the code.

The instrumented code of application 130 may include instructions to update the counter value at various places in the code. For example, the counter counter1 may be incremented by executing the instruction "counter1.increment( )." The counter may be incremented to track various actions or entities associated with the code. For example, the counter may be incremented whenever a particular function or method is called, the counter may be incremented whenever a particular branch of a conditional expression is executed, the counter may be incremented whenever an object of a particular type is created, for example, in a constructor of an object. The increment instruction of the counter may be called conditionally, for example, if a function is invoked with a particular combination of parameters. The application 130 communicates the counter value to the instrumentation analysis system 100 by invoking an API of the instrumentation analysis system 100.

A gauge comprises instructions to measure certain runtime characteristics of the application 130, for example, heap size, number of cache misses or hits, active memory used, CPU (central processing unit) utilization, total time taken to respond to a request, time taken to connect to a service, and so on. A gauge may also be used to track certain application specific parameters or business related values, for example, number of transactions, number of users, and so on. The gauge may be invoked periodically based on an interval that is configurable. The value of the gauge is sent to instrumentation analysis system 100 periodically.

The administration system 160 allows a privileged user, for example, a system administrator to associate data streams with metadata. The administration system 160 comprises the administration application 170 that provides a user interface for a system administrator to specify the metadata. The metadata comprises properties, for example, name-value pairs. The instrumentation analysis system 100 receives metadata describing data streams and stores the metadata. The ability to specify metadata describing data streams independently from the data received from each data stream provides several benefits in generating reports based on the data stream.

As an example, the instrumentation analysis system 100 can receive modifications to metadata describing each data stream without requiring any modifications to the instrumented software of the application 130. As a result, the instrumentation analysis system 100 receives specifications of new reports and modifications to existing reports and generates results based on the new/modified reports without requiring the developers to modify applications 130.

This provides for a new paradigm for instrumenting software since the developers do not need to consider the types of reports that need to be generated while adding instructions to instrument the software. The developers simply instrument their software to generate raw data that can be combined in various ways in the generated report. Systems and methods for real time reporting based on instrumentation of software are described in the U.S. patent application Ser. No. 14/800,677, filed on Jul. 15, 2015 which is incorporated by reference hereby in its entirety.

Furthermore, the persons that are experts at generating the instrumented software can be different from the software developers. For example, an expert at data analysis who is not a developer can define the metadata for the data streams and generate reports without being involved in the development process. This is significant because the skills required for analyzing data are typically different from the skills required for developing software.

Furthermore, the instrumentation analysis system 100 can also receive and process reports built on top of existing reports by composing existing reports and adding new analytics functionality. The instrumentation analysis system 100 generates results of the new reports and sends them for presentation in real-time as the instrumentation analysis system 100 receives data streams from instrumented software. The instrumentation analysis system 100 generates these additional reports and modifies existing reports without requiring any modifications to the instrumented code of application 130.

Furthermore, the instrumentation analysis system 100 provides separation of the metadata describing the data streams from the data of the data streams. Accordingly, the amount of data that needs to be transmitted from the development systems 120 to the instrumentation analysis system 100 is reduced. Each application 130 transmits only the data values of the metrics and information identifying the metric. The metadata information is received separately from a source independent of the data source of the data streams. Accordingly, any amount of metadata may be introduced without increasing the amount of data of each data stream.

The reporting system 150 may be a client device. The reporting system 150 includes a client application 140 that allows a user to interact with the instrumentation analysis system 100. In an embodiment, the client application 140 is an internet browser, which may include client side code (e.g., Java Script) for accessing the instrumentation analysis system 100. In other embodiments, client application 140 is a proprietary application developed for interacting with the instrumentation analysis system 100.

The reporting system 150 can be a conventional computer system (e.g., a desktop or laptop computer), a tablet, or a device having computer functionality such as a personal digital assistant (PDA), a mobile telephone, a smart phone or another suitable device. The reporting system 150 interacts with instrumentation analysis system 100 via a network. The network may comprise any combination of local area and/or wide area networks, using both wired and/or wireless communication systems. In one embodiment, the network uses standard communications technologies and/or protocols.

The instrumentation analysis system 100 may be hosted on a computing system that includes one or more processors, memory, secondary storage and input/output controller. The computing system used for hosting the instrumentation analysis system 100 is typically a server class system that uses powerful processors, large memory, and fast input/output systems compared to a typical computing system used, for example, as a reporting system 150.

In an embodiment, data from several development systems 120 may be consolidated, for example, by a server and the combined data sent to the instrumentation analysis system 100. For example, an enterprise may install a server that receives data stream internally from different development systems 120 and sends the combined data in a batch form to the instrumentation analysis system 100 periodically. This allows efficiency of external communication from the enterprise. However this configuration may result in delay in communicating information to the instrumentation analysis system 100 and the corresponding delay in reporting data by the reporting system 150.

Associating Dimensions with Data Streams

A data stream may be identified by using a set of coordinates representing values of dimensions associated with data streams. A dimension refers to a property of data streams that can take one of a set of values. Each data stream may be associated with a value for a dimension. For example, a dimension can be a source of a data stream or a metric name associated with a data stream. A source of a data stream may be identified by a server name, a service name, and so on. Examples of metric names are cpu (central processing unit) load, cache misses, cache hits, and so on. A value of a dimension is also referred to as a coordinate value of the data stream. A coordinate value may be represented as a metadata attribute stored in the metadata store 230. Given the two dimensions of source and metric, a data stream may be identified by providing the two coordinates representing the source and the metric, for example, (server1, cpu_load) or (server2, memory_usage).

A data stream may be characterized by multiple dimensions (i.e., more than the two dimensions described above, i.e., source and metric name.) For example, if each server has multiple cpus, a dimension cpu_id may be included. Accordingly, each data stream obtained from a system may be characterized by (source_id, cpu_id, metric_name), i.e., a source identifier, a cpu identifier, and a name for the metric. Examples of data streams identified using three coordinates include (server1, cpu1, load), (server1, cpu2, load), (server2, cpu1, load), (server2, cpu2, load) and so on.

As another example of a dimension, a system may define customer name as a dimension. The name of the customer may be reported by the instrumented software, for example, based on the configuration parameters of the instrumented software executing on a development system 120. The customer name may be specified for the instrumented software using a system property. The instrumented software includes the customer name when it identifies a data stream associated with that particular customer. The ability to associate a data stream with a customer allows the instrumentation analysis system to perform customer specific analysis, for example, report on usages of systems for each customer, identify customers reporting more than a threshold number of errors and so on.

A data stream may be obtained from instrumented software or may be generated as a result of execution of blocks of a data stream language program within the instrumentation analysis system. A data stream may also comprise data stored in the instrumentation analysis system, for example, in a data store (such as a time series data store 260 described herein.) The data stream language is also referred to herein as the SignalFlow language.

System Architecture of the Instrumentation Analysis System

Figure 2:
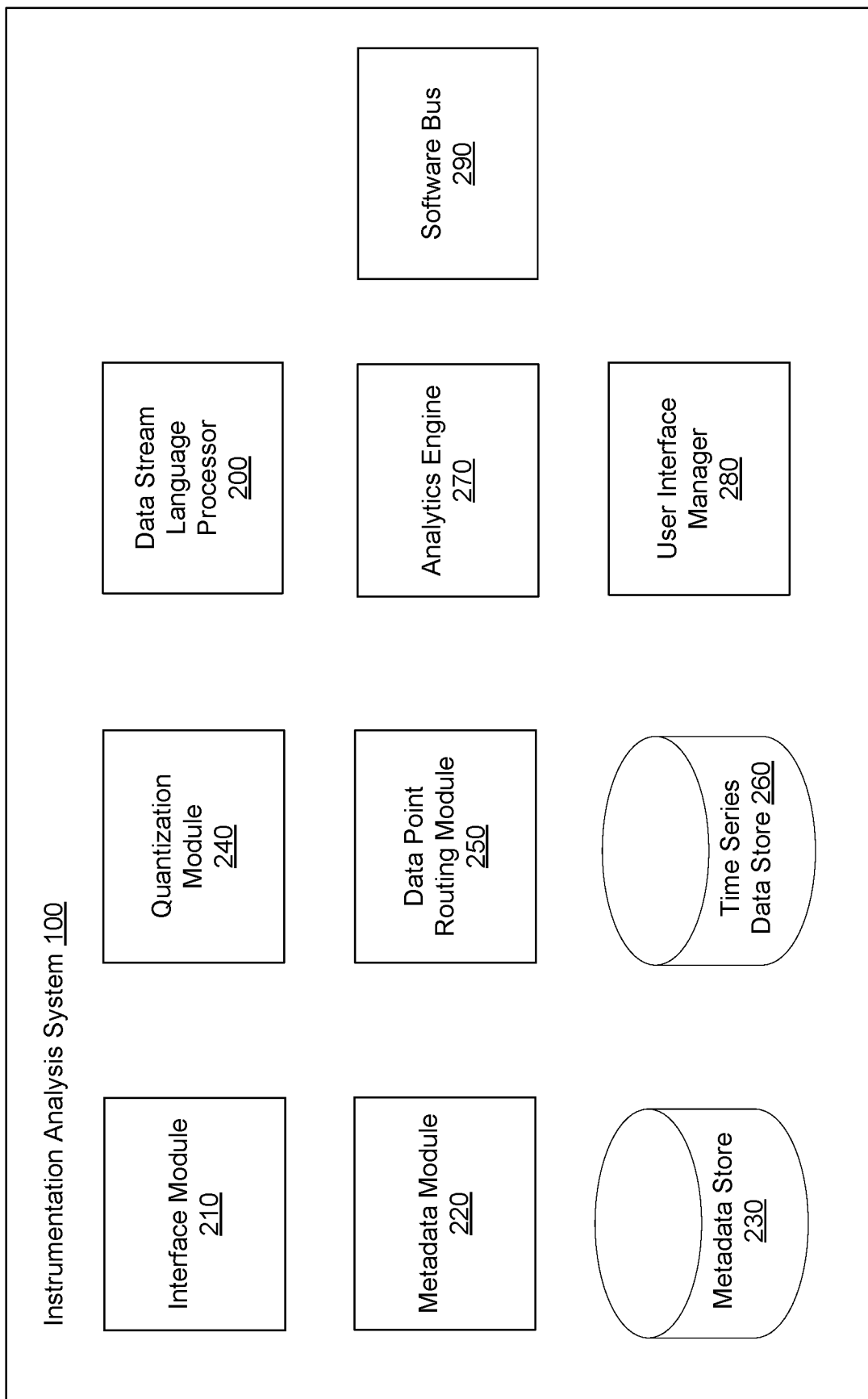
FIG. 2 shows the architecture of a system for executing a data stream language program for processing data streams received from instrumented software, according to an embodiment.

FIG. 2 shows the architecture of a system for executing a data stream language program for processing data streams received from instrumented software, according to an embodiment. The instrumentation analysis system 100 includes an interface module 210, a quantization module 240, metadata module 220, metadata store 230, a data point routing module 250, an analytics engine 270, a user interface manager 280, a data stream language processor 200, a time series data store 260, and software bus 290. In other embodiments, the instrumentation analysis system 100 may include other modules not described herein. Functionality indicated as provided by a particular module may be implemented by other modules instead.

The interface module 210 receives requests from external systems, for example, development systems 120 that communicate with the instrumentation analysis system 100. The interface module 210 supports various application programming interfaces (APIs) that external systems can invoke. The interface module 210 can receive and process data provided by applications 130 that are instrumented using functionality provided by different vendors, so long as the instrumented code sends the information in a format that can be processed by the interface module 210.

The interface module 210 receives data in the form of data streams from one or more development systems 120. In an embodiment, the interface module 210 receives data and represents the incoming data as tuples. Accordingly, each data stream is represented as a plurality of tuples, each tuple representing a data point. A tuple of data received by the interface module 210 comprises various elements. A tuple of data includes a metric identifier, for example, a name of the metric corresponding to the tuple and a value of the metric. The tuple of data received may further comprise other elements, for example, a timestamp corresponding to the time that the data was captured by the application 130 sending the data, one or more properties associated with the data.

In an embodiment, the timestamp associated with a tuple represents the time that the data value was received by the instrumentation analysis system 100. The properties associated with the data may be provided in the form of name, value pairs. These properties may provide additional information describing the data received, for example, information describing the source of the data such as a host name, server name, device name, or service name associated with the source, a method or function name associated with the data, an application instance identifier, and so on.

In an embodiment, the interface module 210 generates and assigns an identifier to records received by the interface module 210. The identifier is referred to herein as a time series identifier (also referred to herein as a TSID or tsid). A unique time series identifier is assigned to all tuples matching a metric name and a set of properties received with the tuple. Accordingly, a tuple (metric name, properties, metric value, timestamp) gets mapped to a tuple (tsid, metric value, timestamp). For example, if a tuple provides a metric name m1, and a hostname h1, all tuples with metric name m1 and hostname h1 are assigned the same time series identifier. Accordingly, the tsid uniquely identifies all tuples of a data stream received by the instrumentation analysis system 100.

The quantization module 240 processes data values received so as to transform an input time series of data in which data is available at arbitrary time intervals to a time series in which data is available at regular time intervals. For example, the data values received in an input time series may occur at irregular interval, however, the quantization module 240 processes the data of the time series to generate a time series with data occurring periodically, such as every second, or every 5 seconds, or every 15 seconds, and so on. This process is referred to herein as quantization of the time series. In an embodiment, the interface module 210 creates multiple threads or processes, each thread or process configured to receive data corresponding to a data stream. Each thread or process invokes the quantization module 240 to perform quantization of the data received for each data stream for each time interval. Systems and methods for quantization of data streams of instrumented software are described in the U.S. patent application Ser. No. 14/800,679, filed on Jul. 15, 2015 which is incorporated by reference hereby in its entirety.

The metadata module 220 receives and stores metadata information describing various data streams received from the development systems 120. In an embodiment, the metadata stored in the metadata module 220 is received from a user, for example, a system administrator interacting with the instrumentation analysis system 100 using the administration system 160.

The metadata may be represented as name-value pairs. In an embodiment, the metadata is represented as metadata objects, each object defining a set of properties that may be represented as name-value pairs. A set of data streams may be associated with the metadata object. Accordingly, all properties represented by the metadata object are associated with each data stream that is associated with the metadata object.

The metadata datastore 230 stores the metadata objects and their associations with the data streams. The metadata datastore 230 stores an identifier (ID) for each metadata object and the properties represented by the metadata object. In an embodiment, each data stream is associated with a time series identifier that uniquely identifies the data stream. The metadata datastore 230 stores an index that maps each metadata object to a set of time series identifier values. The metadata store 230 may receive instructions to modify a metadata object. For example, the metadata store 230 may receive instructions to modify, add or delete some properties represented by a metadata object. Alternatively, the metadata store 230 may receive instructions to modify the mapping from a metadata object to a data stream. For example, the metadata store 230 may receive instructions to associate a data stream with a metadata object or delete an association between a metadata object and a data stream.

In an embodiment, the metadata store 230 is represented as a relational database but may be represented as any other type of database or data store. For example, the metadata store 230 may be a relational database storing tables that map metadata object IDs to time series IDs identifying data streams. Other database tables may store the properties associated with each metadata object as a mapping from metadata object ID to each property represented as a name-value pair.

The user interface manager 280 renders the user interface for allowing users to specify the parameters of a data stream language program and to present results of execution of the data stream language program. The user interface manager 280 may display real-time results of a data stream language program as one or more charts that are periodically updated as the data of the data streams is received. The user interface manager 280 also presents a user interface that allows users to specify a data stream language program visually rather than textually. Examples of screenshots of user interfaces presented by the user interface manager 280 are described herein.

The time series data store 260 stores data received from various sources, for example, development systems 120. The time series data store 260 is also referred to herein as time series database (or TSDB.) In an embodiment, the time series data store 260 also stores the time series data after the data is quantized. The time series data store 260 may also store rollup data for each time series. The time series data store 260 also stores results of various analytics requests, for example, results of various reports requested by user. The analytics engine 270 computes results for certain reports, for example, moving averages over intervals of time by combining data stored in the time series data store 260 with new data obtained as data stream from various sources.

The software bus 290 provides a mechanism for modules of the instrumentation analysis system 100 to provide data of data streams to other modules of the instrumentation analysis system 100. A data stream language program may send a data stream to the software bus 290. Other modules, for example, fetch module 320, find module 310, window module 380, and so on can read the data from the software bus 290 and perform further processing on the data. For example, a data stream output of a data stream language program published on the software bus 290 may be identified by a find block of another data stream language program executing as a job.

The data stream language processor 200 executes programs specified using the data stream language. The data stream language processor 200 receives a data stream language program, parses the data stream language program to validate the program. The data stream language processor 200 generates a representation of the data stream language program and executes the data stream language program using the representation.

The requests specified using the data stream language is a query based on the metadata associated with data received from various development systems 120. The data stream language supports various types of analytic functions, for example, aggregations and transformations. The data stream language provides the ability to compose various functions including aggregations and transformations in various ways. In an embodiment, the data stream language processor 200 parses programs specified using the data stream language, generates an executable representation of the program, and executes the generated representation.

Data Stream Language

A program specified using the data stream language comprises units of computation called blocks. Each block is associated with a particular processing or computation performed by the data block. Each block may also have one or more input ports and one or more output ports. A block receives input via an input port, performs certain computation using the data and sends the result of the computation to the output port. This process is repeated at a pre-specified periodicity. Accordingly, an input port acts as a mechanism to provide data to the block and an output port acts as a mechanism to output data of the block.

In an embodiment, each block is associated with a type of the block. The type of the block determines the computation performed by the block. The types of blocks supported by the data stream language include a find block, a fetch block, a statistical computation block, a threshold block, and so on. A block may be associated with certain configuration parameters. For example, a find block may take an expression as input. A data stream language program includes instances of a type of block. For example, a find block with a particular search expression is an instance of the find block that is included in a data stream language program.

In an embodiment, an input port of a block is identified with character "?" and an output port is identified with character "!". Other embodiments may identify the input/output ports using other syntax. For example, if a block B1 has input ports in1 and in2, a specific input port (say in2) may be identified as "B1?in2". Similarly, if block B1 has output ports out1 and out2, a specific output port (say out2) can be specified as "B2!out2". If a block has a single input/output port, the data stream language program may not identify the port. For example, if block B2 has a single input port, the input port may be referred to as "B2". Similarly, if block B2 has a single output port, the output port may be referred to as "B2".

Two blocks may be connected by specifying that the output of one block is provided as input of the other block. Accordingly, a data stream language program can be considered a network of blocks. In an embodiment, the connection between two blocks is specified using an arrow between the two blocks. For example, if B1 and B2 both have a single input port and a single input port, "B1→B2" specifies that the output of B1 is provided as input of block B2. Similarly, if B1 has two output ports out1 and out2 and B2 has two input ports i1 and in2, the out1 port of B1 may be connected to the in2 port of B2 by the expression "B1!out1→B2?in2".

The data stream language processor 200 may execute multiple jobs based on a data stream language program. Each job may be associated with a start time, an end time, and a periodicity. Accordingly, the job is executed from the start time until the end time at intervals specified by the periodicity. The periodicity specifies the rate at which data is processed by the data stream language program. A user may specify different jobs for execution based on the same data stream language program, each job associated with different start time, end time, and periodicity.

Figure 3:
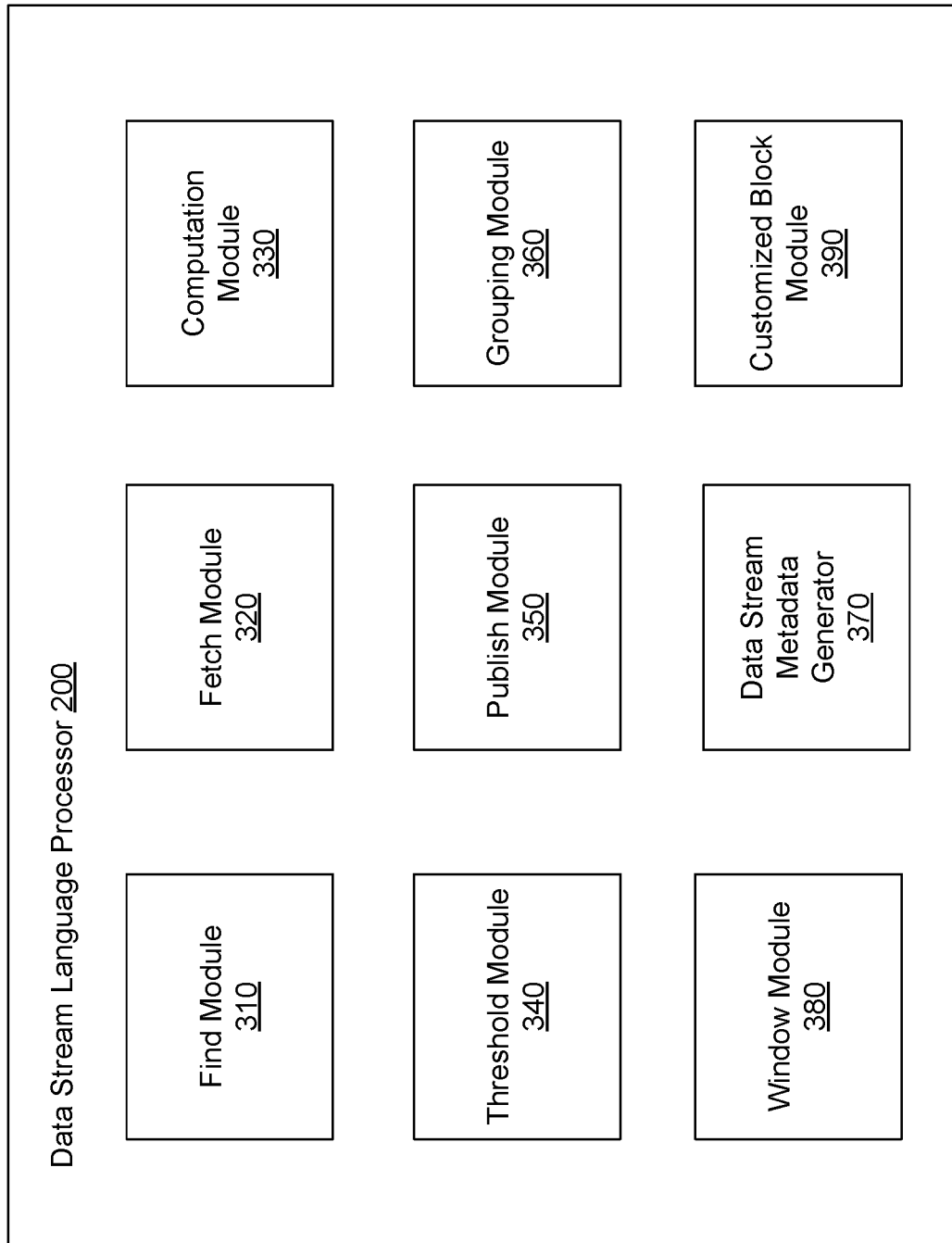
FIG. 3 shows the architecture the data stream language processor for processing blocks of data stream language programs, according to an embodiment.

FIG. 3 shows the architecture of the data stream language processor for processing blocks of data stream language programs, according to an embodiment. As shown in FIG. 3, the data stream language processor 200 includes modules for processing various types of blocks of the data stream language. Accordingly, the data stream language processor 200 includes a find module 310, a fetch module 320, a computation module 330, a threshold module 340, a publish module 350, a grouping module 360, a window module 380, a data stream metadata generator 370, and a customized block module 390. Other embodiments may include more or less modules than those shown in FIG. 3. Certain modules are not illustrated in FIG. 3, for example, a parser. The details of each module are further described herein along with details of the types of blocks processed by each module.

The find module 310 executes the find block to identify a set of data streams for processing by the rest of the data stream language program. The fetch module 320 fetches data from the identified data streams and provides the data for processing by subsequent blocks of the data stream language program. The computation module 330 performs statistical computations specified in the data stream language program, for example, mean, median, sum, and so on. The threshold module 340 compares data of an incoming data stream with a threshold value to determine if the incoming data exceeds certain bounds. The threshold value specified for comparison may dynamically change, for example, a threshold value may be specified as a one hour moving average of the input data stream scaled by certain factor. The publish module 350 executes the publish block that provides the output of the blocks preceding the publish block to various receivers including a user interface (e.g., a dashboard) for presenting the results, for storing in a database, or for providing to other blocks for further processing. The grouping module 360 performs grouping of data of input data streams to generate a set of result data streams corresponding to each group. The groups may be based on one or more attributes specified with the grouping command, for example, groups of data streams from each data center. The data stream metadata generator 370 generates metadata representing result data streams generated as a result of executing data stream language programs and stores the metadata in the metadata store 230 for allowing other components of the instrumentation analysis system 100 to use the result data stream. The customized block module 390 processes user defined blocks (customized blocks) in a data stream language program.

Example Data Stream Language Program

Figure 4:
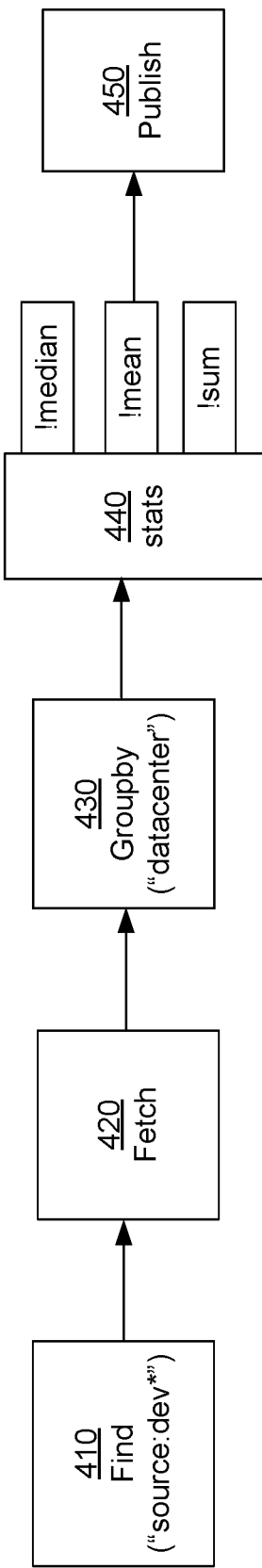
FIG. 4 shows an example of a data stream language program for illustrating features of the data stream language, according to an embodiment.

FIG. 4 shows an example of a data stream language program for illustrating features of the data stream language, according to an embodiment. FIG. 4 represents the data stream language program in terms of blocks. The data stream language program shown in FIG. 4 can be specified as follows.

```
find("source:analytics*") → fetch
                         → groupby("datacenter")
                         → stats!mean
                         → publish
```

The first block of the above data stream language program is a find block 410 that takes a string parameter that specifies a search expression. The find block finds a set of data streams received by the instrumentation analysis system 100 that satisfy the search expression. For example, the find block 410 takes search expression "source:dev" that identifies all data stream that the "source" metadata attribute value "dev." For example, an enterprise may associated all development systems with source value "dev." The output of the find block is provides as input to a fetch block 420.

The fetch block 420 retrieves data from the data streams identified by the find block. The fetch block receives data at a pre-specified periodicity. The fetch block may receive real time data of data streams received by the interface module 210 and quantized by the quantization module 240. The fetch block 420 may also receive data of data streams stored in the time series data store 260. The output of the fetch block 420 is provided as input to the groupby block 430.

The groupby block 430 takes names of one or more attributes of data streams as input. The groupby block 430 groups the data streams by the specified attributes. As shown in the example above, the groupby block 430 takes a "datacenter" attribute as input and groups the data streams by their datacenter value. Accordingly, data of all data streams having the same data center is grouped together. The groupby block 430 outputs a data stream corresponding to each value of data center. The output of the groupby block 430 is provided as input to the stats block 440 (which is a type of statistical computation block).

The stats block 440 has multiple outputs, for example, mean, median, sum, and so on. Each output port provides values based on the type of computation specified by the name of the output. The stats block 440 computes the mean value for each group of data streams received as input from the groupby block 430. Accordingly, the stats block 440 determines the mean of data received from data streams of each datacenter. As shown in FIG. 4, the mean output port of the stats block provides input to the publish block 450.

The publish block 450 may be configured to publish the received input on a dashboard. The publish block may be configured to publish the data on the software bus 290. The software bus 290 provides the data to all other modules of the instrumentation analysis system 100. The data stream language processor 200 executes the various blocks specified above at a periodicity specified for the data stream language program.

In some embodiments, the data stream language program includes instructions for smoothing one or more data streams. The smoothing operator may be applied to data streams received from instrumented software or to data streams that are generated by a data stream language program. The smoothing operator is implemented using double exponential smoothing techniques disclosed herein.

Overall Process of Execution of a Data Stream Language Program

Figure 5:
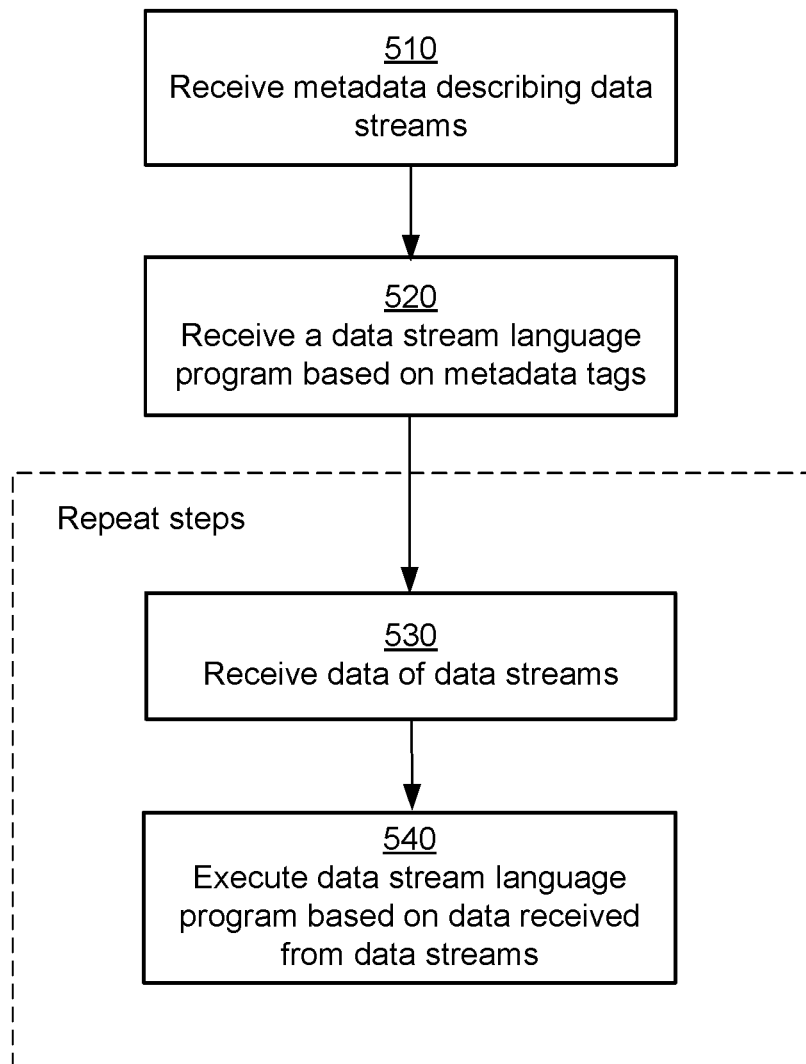
FIG. 5 shows the overall process of an instrumentation analysis system for processing data received from data streams based on a data stream language program, according to an embodiment.

FIG. 5 shows the overall process of an instrumentation analysis system for processing data received from data streams based on a data stream language program, according to an embodiment. The metadata module 220 receives 510 metadata describing data streams. The metadata definition is received independent of the data of the data streams themselves. For example, the data stream may simply provide tuples comprising a data value and a timestamp associated with the data value without providing any properties (for example, name-value pairs.) The metadata module 220 receives the properties describing the data streams from a source different from the source providing the data stream. For example, the data streams are provided by instances of instrumented software that is executing on development system 120, whereas the metadata definition may be provided by a system administrator via the administration system 160.

The analytics engine 270 receives 520 a data stream language program using the metadata attributes describing data streams. The data stream language program may represent a set of instructions provided to the instrumentation analysis system 100 to generate reports describing the instrumented software and provide the results in real-time, i.e., as the data of the data streams is received.

The instrumentation analysis system 100 repeats the following steps as data of various data streams is received by the instrumentation analysis system 100 from various development systems 120. The interface module 210 receives 530 data of different data streams. In an embodiment, the interface module 210 waits for a fixed interval of time, for example, 1 second or a few seconds and collects data received from different data streams. In an embodiment, the quantization module 240 performs quantization of the data for each incoming data stream for each time interval. Accordingly, data from each data stream is aggregated into a single value associated with the data stream for that time interval.

The analytics engine 270 executes 540 the data stream language program based on the data of the data streams for the time interval. If the data is quantized for each data stream, the analytics engine 270 executes 540 the data stream language program using the quantized values from each data stream. The data stream language program may include a publish block that causes the analytics engine 270 to send the result(s) of evaluation of the data stream language program for presentation, for example, to a user interface.

The data stream language program may generate one or more data streams. The analytics engine 270 also stores the data streams generated as a result of evaluation of the data stream language program, for example, in the time series data store 260. The analytics engine 270 creates one or more new data streams (or time series) representing the results of the data stream language program. The new data streams are stored in the time series data store 260. This allows the result of the data stream language program to be used as input to other data stream language program. For example, a data stream language program may generate data representing the $95^{th}$ percentile of values received from a plurality of data streams. The result of the data stream language program may be stored in the time series data store 260 as a new data stream. The analytics engine 270 may further execute another data stream language program that computes a moving average value based on the generated data stream.

User Interface for Generating Reports Using Data Stream Language Programs

In some embodiments, the instrumentation analysis system 100 provides a user interface that generates data stream language programs for the end user interested in viewing the reports based on data streams. The user is provided with a user friendly user interface that hides the complexity of the data stream language. The user interface provided by the instrumentation analysis system shows various widgets that allow users to take actions such as select the metrics for generating reports, performing rollups, grouping data streams and so on.

Figure 6:
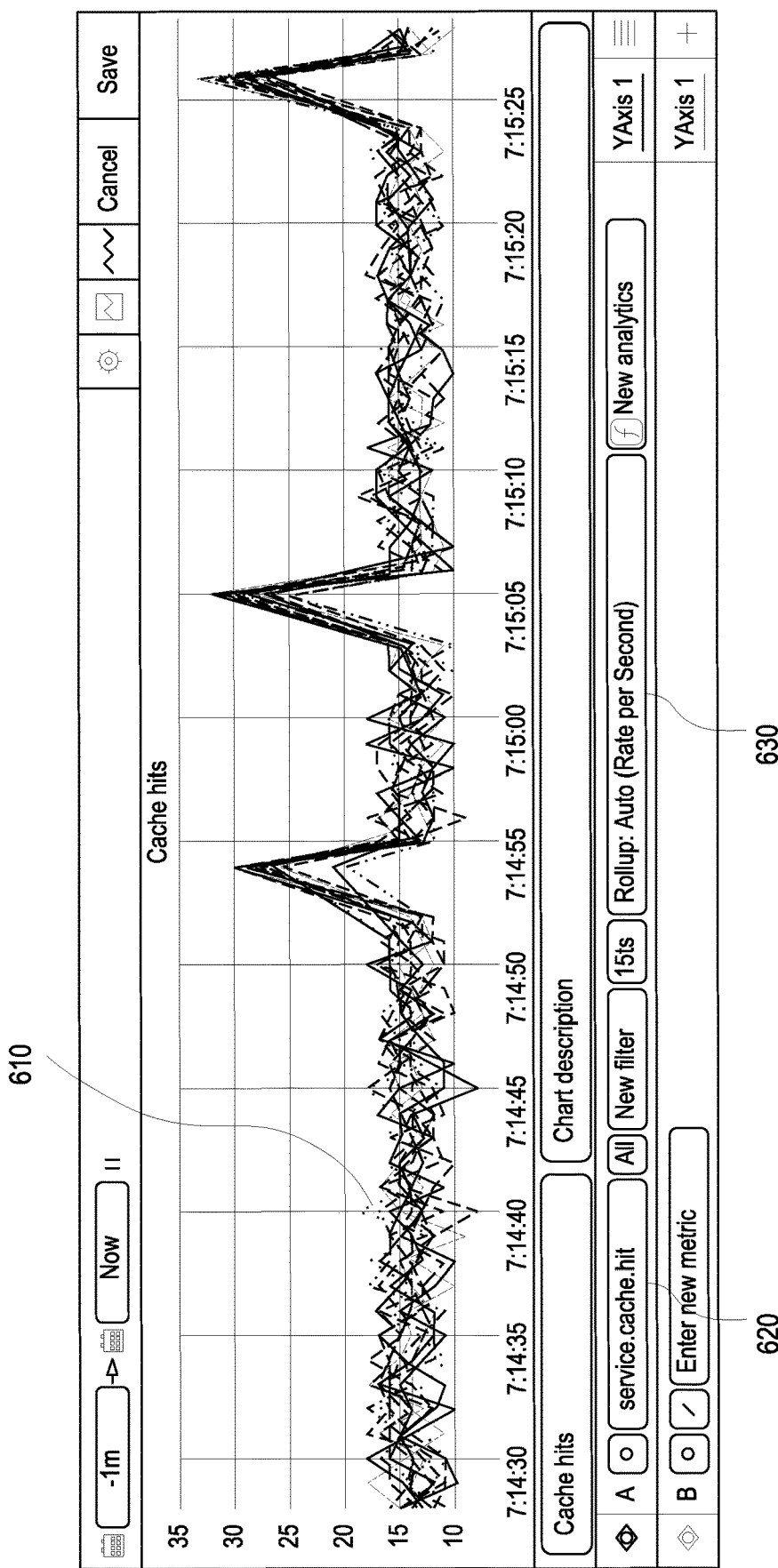
FIG. 6 shows a screenshot of a user interface displaying result of execution of a data stream language program that shows data streams received by the instrumentation analysis system, according to an embodiment.

FIG. 6 shows a screenshot of a user interface displaying result of execution of a data stream language program that shows data streams received by the instrumentation analysis system, according to an embodiment. The screenshot shows several charts 620 displaying data streams representing metric 620 service.cache.hits. The metric represents cache hit values received from instrumented software executing on development systems 120. The values are rolled up to a time interval of 1 second. Accordingly, the cache hits values received in each time interval of one second are added together. There can be a large number of services reporting the metric service.cache.hits and accordingly a large number of charts 620 is displayed. FIG. 6 shows various widgets that allow a user to take actions, for example, select the metric that is reported by the user interface, perform rollups.

Figure 7:
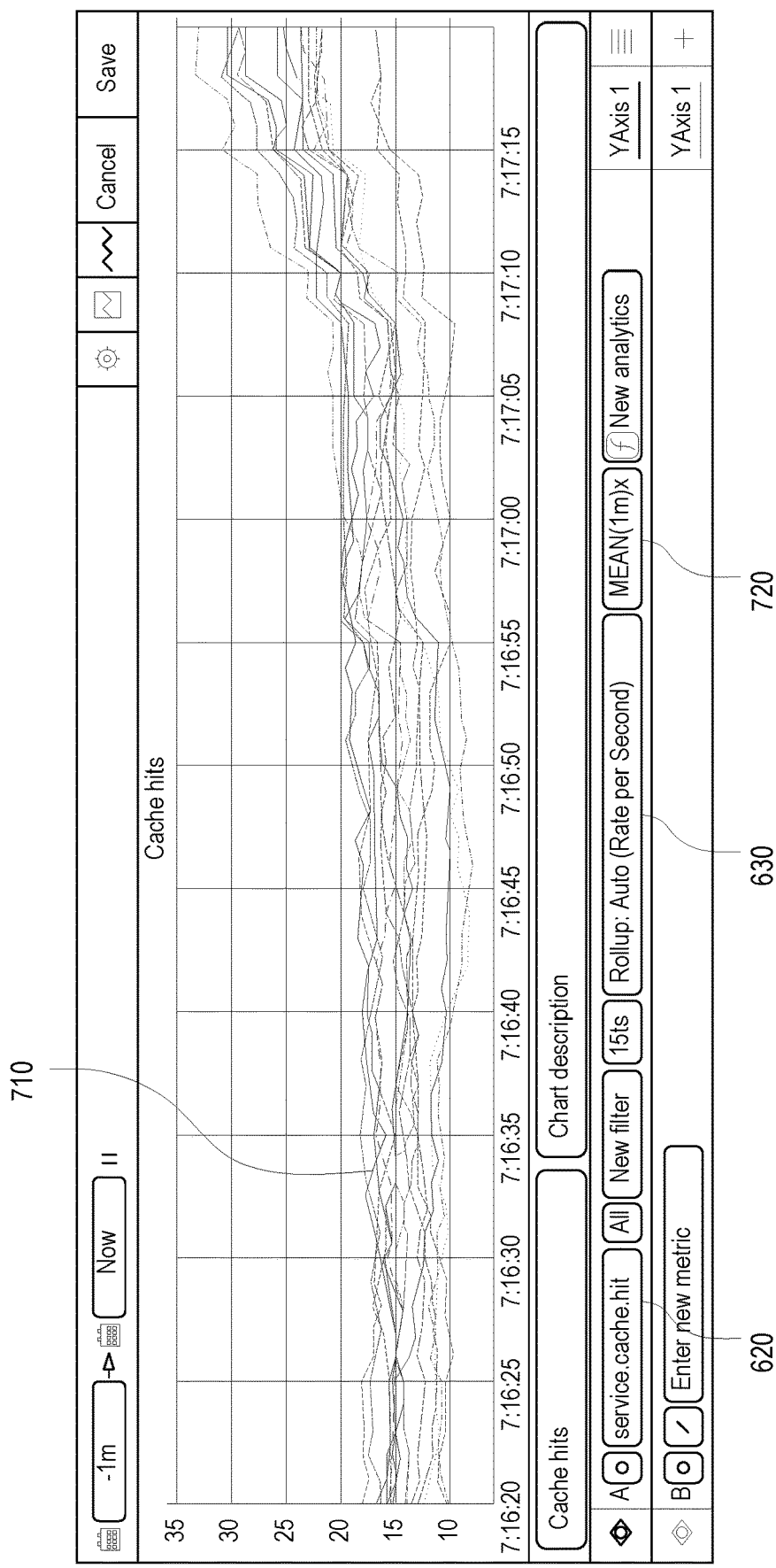
FIG. 7 shows a screenshot of a user interface displaying result of execution of a data stream language program showing 1 minute average of data of data streams received by the instrumentation analysis system, according to an embodiment.

FIG. 7 shows a screenshot of a user interface displaying result of execution of a data stream language program showing 1 minute average of data of data streams received by the instrumentation analysis system, according to an embodiment. FIG. 7 shows a widget that allows a user to specify certain computations to be performed on the data streams. Specifically, FIG. 7 shows a widget 720 that computes a one minute mean for each data stream. As a result the charts 710 are smoother than the charts shown in FIG. 6. However the number of charts 710 shown in FIG. 7 is same as the number of charts 610 shown in FIG. 6.

Determining an Alert Condition Using the KPSS Statistic

In some embodiments, the instrumentation analysis system 100 determines an alerting scheme based on a Kwiatkowski-Phillips-Schmidt-Shin (KPSS) statistic. An alert condition for a data stream can depend on the characteristics of the data stream. For example, the data stream language processor 200 receives a data stream language program with instructions for processing a time series using the KPSS statistic for a rolling window. The fetch module 320 fetches data in the time series (e.g., newly received data values, and any data values to be removed from the window) received from a development system 120. The computation module 330 computes a KPSS statistic based on the fetched data. The threshold module 340 compares the KPSS statistic to one or more thresholds to determine whether or not the time series is stationary. If the time series is determined to be stationary, the instrumentation analysis system 100 can be instructed to provide an alert when one or more values in the data stream deviate from the stationary pattern. If a data stream is determined to have a stationary trend (e.g., is stationary around a linear trend), the instrumentation analysis system 100 can be programmed (e.g., using the double exponential smoothing method) to provide an alert when the data stream deviates from the stationary trend.

KPSS statistics are used to test hypotheses about the stationarity of a time series. For example, a level-stationarity KPSS statistic tests a hypothesis that a time series is stationary around its mean, and a trend-stationarity KPSS statistic tests a hypothesis that a time series is stationary around a linear trend. The KPSS statistic is calculated based on the time series over a period of time, e.g., all measurements in the last hour, or the last 50 measurements in the time series. The KPSS statistic is compared to a threshold, which is based on the number of points in the time series used to calculate the KPSS statistic.

A data stream that comprises a series of data points received at successive times (e.g., at a fixed interval) over a longer period of time can be considered a time series. For real-time stationarity analysis of a data stream, a series of KPSS statistics can be calculated in real-time based on a rolling window of data from the data stream. For example, each time a new data point in the data stream is received, the instrumentation analysis system 100 calculates a new KPSS statistic based on the data used to calculate the KPSS statistic calculated immediately prior, but with the oldest data point removed, and the new data point added.

Calculating the KPSS statistic anew each time a data point is added can be computationally intensive; the standard calculation of the KPSS statistic involves calculating a new mean, new residuals from the mean for each data point, and a new set of partial sums. While this computational burden is acceptable for offline econometric modeling, the traditional KPSS calculation method is too slow and computationally expensive to be used for real-time streaming analytics. Thus, to calculate the KPSS in real time on a rolling window, an incremental-decremental implementation is provided. This implementation can be used in the instrumentation analysis system for real-time data stream analysis. The incremental-decremental implementation involves tracking a relatively small number of intermediate values (e.g., 12 values in one implementation of the level-stationarity KPSS statistic) and making a relatively small number of new calculations for each new data point in the time series (e.g., 16 calculations in one implementation of the level-stationarity KPSS statistic), no matter the number of data points included in the rolling window. The incremental-decremental implementation can also handle nulls in the data stream, e.g., if an expected data point was not received.

The result of the KPSS statistics can be used to determine the stationarity of the data stream, which can be used to select an alerting scheme. For example, if the KPSS statistic indicates that the data stream is stationary, and if the distribution is known, a static threshold can be used as a rule for generating an alert. If the KPSS statistic indicates that the data stream is stationary, and if the distribution is not known, then a sudden change alert scheme can be used. If a level-stationarity KPSS statistic indicates that the data stream is not stationary, but a trend-stationarity KPSS statistic indicates that the data stream is trend-stationary, the double exponential smoothing method can be used to provide alerts. If both the level-stationarity KPSS statistic and the trend-stationarity KPSS statistic indicate that the data stream is not stationary, the data stream can be analyzed to determine whether the data stream exhibits seasonality, in which case a historical anomaly scheme can be used to provide alerts. By monitoring the KPSS statistics in real time, the instrumentation analysis system can determine whether the trend of a data stream has changed (e.g., if a previously stationary data stream is no longer exhibiting stationarity). The instrumentation analysis system 100 can provide an alert if the stationarity has changed, and/or can recommend a different type of alert scheme.

Figure 8:
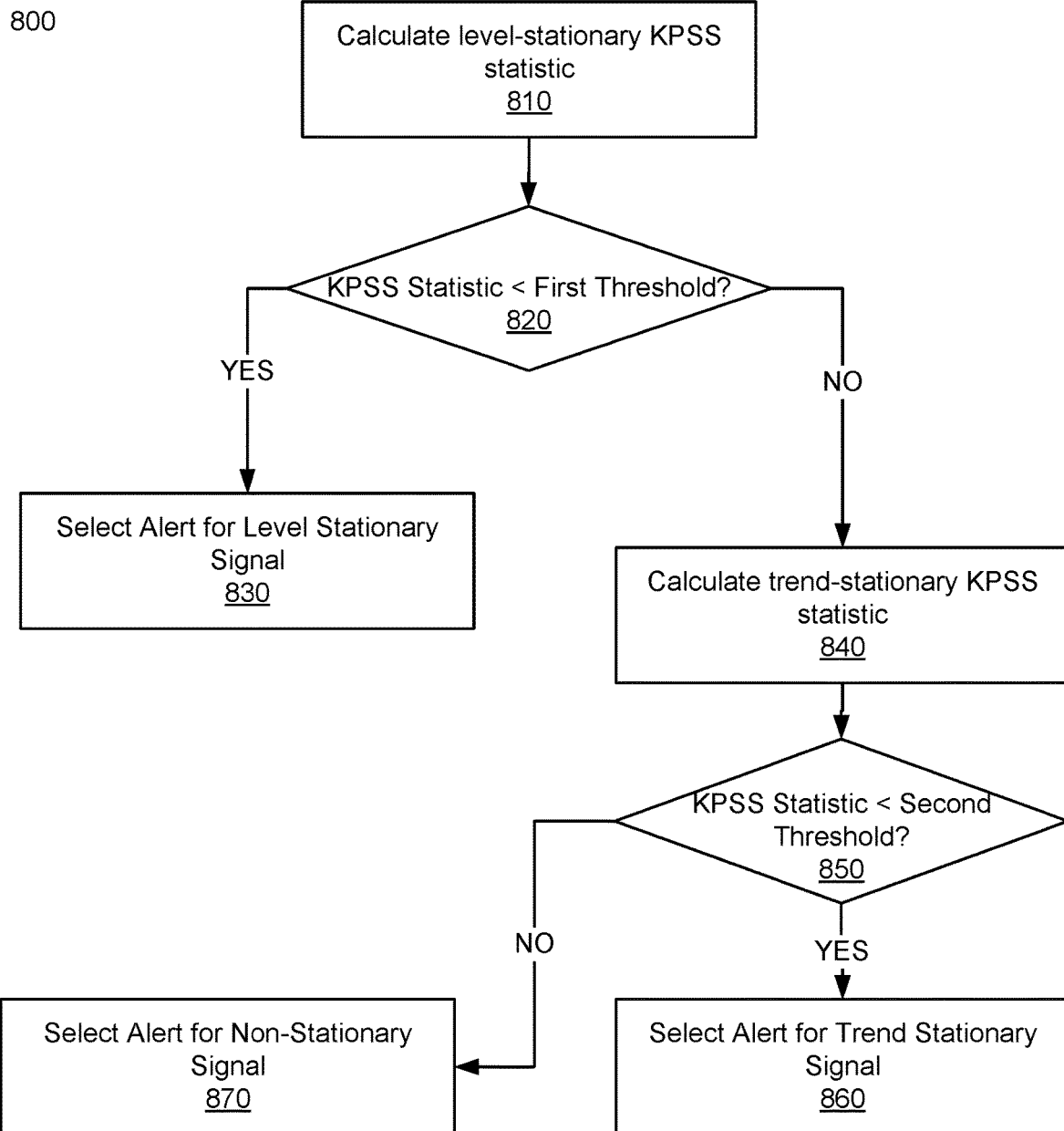
FIG. 8 shows a flowchart for how the KPSS statistic is used for selecting an alert based on level-stationarity and trend-stationarity, according to one embodiment.

FIG. 8 shows a flowchart for how the KPSS statistic is used for selecting an alert based on level-stationarity and trend-stationarity, according to one embodiment. The instrumentation analysis system 100 (e.g., the computation module 330) calculates 810 the level-stationarity KPSS statistic based on a window of a received data stream. The instrumentation analysis system 100 (e.g., the threshold module 340) determines 820 if the level-stationarity KPSS statistic is less than a first threshold for level-stationarity. The first threshold may be, for example, in the range of 0.5 to 1.0 for a time series of length 20 through 50. If the level-stationarity KPSS statistic is below the first threshold, the instrumentation analysis system 100 selects 830 an alerting scheme for a level-stationary signal.

If the level-stationarity KPSS statistic is above the first threshold, the instrumentation analysis system 100 (e.g., the computation module 330) calculates 840 the trend-stationarity KPSS statistic. The instrumentation analysis system 100 (e.g., the threshold module 340) determines 850 if the trend-stationarity KPSS statistic is less than a second threshold. The second threshold is typically smaller than the first threshold. For example, "Testing the null hypothesis of stationarity against the alternative of a unit root" by D. Kwiatkowski, P. C. Phillips, P. Schmidt, and Y. Shin and published in Journal of Econometrics 54, shows that a value of 0.73 for the level-stationarity KPSS statistic corresponds to a p-value of 0.01 whereas a value of 0.216 for the trend-stationarity KPSS statistic corresponds to a p-value of 0.01. If the trend-stationarity KPSS statistic is less than the second threshold, the instrumentation analysis system 100 selects 860 an alerting scheme for a trend-stationary signal. The alert can be, for example, based on a double exponential smoothing of the data stream, as described in application Ser. No. 16/129,494, filed Sep. 12, 2018. If the trend-stationarity statistic is not less than the second threshold, the instrumentation analysis system 100 selects 870 an alert for a non-stationary signal. The instrumentation analysis system 100 may perform further analysis on the signal after this determination in order to determine a distribution, such as a seasonal distribution, according to an embodiment.

The KPSS statistics can also be used for other applications. For example, the slope and intercept of a trend-stationary data stream can be used to forecast a future value of the data stream. As another example, the KPSS statistic can be used to identify jumps in a trend line for monitoring heap use; the jumps can then be used to identify minima after garbage collections.

Overview of Incremental-Decremental Implementation of KPSS Statistic

The instrumentation analysis system 100 computes the KPSS statistic for a time series of data values $x_1, x_2, \ldots$ on a rolling window of data of size n, where the data values in current window are denoted by $\{x_1 \ldots x_n\}$. A basic framework of the rolling window includes a priming phase, during which the first n data values for the time series are added to the rolling window, and a streaming phase, during which the instrumentation analysis system 100 alternates between discarding the oldest data value in the rolling window and adding a new data value to the rolling window. The instrumentation analysis system 100 uses the following algorithm as a template for the rolling window framework.

---

Prime and Stream Algorithm

--- for i = 1 to n do
  add($x_i$)
for i = n + 1 to ∞ do
  remove($x_{i-n}$)
  add($x_i$)

---

To increment, the instrumentation analysis system 100 adds new data value $\{i, x_i\}$ to the rolling window and re-calculates the KPSS statistic to include the influence of the new data value. To decrement, the instrumentation analysis system 100 removes the oldest data value $x_1$, also referred to as a trailing value, from the rolling window and eliminates the influence of the trailing value on the KPSS statistic. Viewing x as a time series, a simple linear trend is described by the model $x_i = \beta_0 + \beta_1 i + \epsilon_i$. In computing the KPSS statistic, the instrumentation analysis system 100 determines $\hat{\beta}_0$ and $\hat{\beta}_1$ such that the sum of squared errors $\Sigma_i (x_i - (\beta_0 + \beta_1 i))^2$ is minimized. In a typical implementation of the KPSS statistic, the mean $\mu$ of the time series $x_1 \ldots x_n$ is used to calculate residual values $e_1 = x_1 - \mu \ldots e_n = x_2 - \mu$. Partial sums of the residual values $s_1 = e_1$, $s_2 = e_1 + e_2$, $s_n = e_1 + e_2 + \ldots + e_n$ are used to calculate the sum of squared residuals for the KPSS statistic $s_1^2 + s_2^2 + \ldots + s_n^2$.

In order to increment and decrement on the rolling window without recalculating the residual values, partial sums, and sum of squared residuals, the instrumentation analysis system 100 tracks a set of tracked values that are based on current data values in the rolling window. The set of tracked values used for the level-stationarity KPSS statistic includes 12 values. The set of tracked values used for the trend-stationarity KPSS statistic includes the set of 12 tracked values used for the level-stationarity KPSS statistic, and an additional 4 values. The sets of tracked values are described in greater detail below. In response to receiving a new data value, the instrumentation analysis system 100 updates the tracked values to add an influence of the new data value and remove an influence of the trailing data value. The instrumentation analysis system 100 computes an updated KPSS statistic based on the updated tracked values to add an influence of the new data value and remove an influence of the trailing value.

Computing the Level-Stationarity Kpss Statistic

The instrumentation analysis system 100 (e.g., the computation module 330) uses an add process and a remove process to increment and decrement the data values in the rolling window, update the set of tracked values, and subsequently calculate the level-stationarity KPSS statistic based on the tracked values. For the level-stationarity KPSS statistic, the tracked values include a count value, a sum value, a sum squares value, a weighted sum value, a sum sizes value, a sum squared sizes value, a sum squared sums value, a sum count sums value, a sum squared counts value, a sum counts value, and a sum sums value. These values are referred to as COUNT ($\Sigma_{i \in I} 1$), SUM ($\Sigma_{i \in I} x_i$), SUMSQUARES ($\Sigma_{i \in I} x_i^2$), WEIGHTEDSUM ($\Sigma_{i \in I} i x_i$), SUMSIZES ($\Sigma_{i \in I} i$), SUMSQUAREDSIZES ($\Sigma_{i \in I} i^2$), SIZE, SUMSQUAREDSUMS ($\Sigma_{i \in I} (\Sigma_{j \in I_{\leq i}} x_j)^2$), SUMCOUNTSUMS ($\Sigma_{i \in I} [\Sigma_{j \in I_{\leq i}} x_j \Sigma_{j \in I_{\leq i}} 1]$), SUMSQUAREDCOUNTS ($\Sigma_{i \in I} (\Sigma_{j \in I_{\leq i}} 1)^2$), SUMCOUNTS ($\Sigma_{i \in I} (\Sigma_{j \in I_{\leq i}} 1)$), and SUMSUMS ($\Sigma_{i \in I} (\Sigma_{j \in I_{\leq i}} x_j)$), respectively, where I denotes a subset of $\{1, \ldots, n\}$. SIZE corresponds to the size of the rolling window.

The below function addLevel(x) handles the logic of how to add a new data value x in the rolling window to the set of tracked values. The function addLevel(x) can be used as the add(x) function in the Prime and Stream algorithm provided above for the level-stationarity KPSS statistic.

---

Function 1 | addLevel(x)

---

SIZE += 1
if x is not Null then
  COUNT += 1
  SUM +=1
  SUMSQUARES += x * x
  WEIGHTED SUM += SIZE * x
  SUMSIZES += SIZE
  SUMSQUAREDSIZES += SIZE * SIZE
  SUMSUMS += SUM
  SUMSQUAREDSUMS += SUM * SUM
  SUMCOUNTSUMS += COUNT * SUM
  SUMCOUNTS += COUNT
  SUMSQUAREDCOUNTS += COUNT * COUNT

---

The below function removeLevel(x) handles the logic of how to remove a trailing value in the rolling window from the set of tracked values. The function removeLevel(x) can be used as the remove(x) function in the Prime and Stream algorithm provided above for the level-stationarity KPSS statistic.

| Function 2 | removeLevel(x)SIZE -= 1 |

```
SUMSQUAREDSUMS -=2 * x * SUMSUMS - x * x * COUNT
SUMCOUNTSUMS -= SUMSUMS + x * (SUMCOUNTS - COUNT)
SUMSUMS -= COUNT * x
SUMSQUAREDCOUNTS -=2 * SUMCOUNTS - COUNT
SUMCOUNTS -= COUNT
SUMSQUAREDSIZES -= (2 * SUMSIZES - COUNT)
SUMSIZES -= COUNT
WEIGHTED SUM -= SUM
if x is not Null then
    SUM -= x
    SUMSQUARES -= x * x
    COUNT -= 1
```

For level-stationarity, $e_j = y_j - \bar{y}$ denotes the difference between the jth observation and the jth fitted value where $\bar{y} = \Sigma_{i \in I} y_i$. $S_i = \Sigma_{j=1}^{i} e_j$ denotes the partial sum of the first i residuals. The level-stationarity KPSS statistic is calculated using the following formula:

$$KPSS_{Level} = \Sigma_{i \in I} S_i^2 / |I| \Sigma_{i \in I} e_i^2 \qquad (1)$$

The denominator may be expressed as a function of several tracked values:

$$|I| \sum_{i \in I} e_i^2 = \qquad (2)$$

$$\sum_{i \in I} 1 \sum_{i \in I} x_i^2 - \left(\sum_{i \in I} x_i\right)^2 = COUNT * SUMSQUARES - SUM * SUM$$

The numerator may also be expressed as a function of several tracked values:

$$\sum_{i \in I} S_i^2 = \qquad (3)$$

$$\sum_{i \in I} \left(\sum_{j \in I_{\leq i}} x_j\right)^2 - 2\bar{x} \sum_{i \in I} \left[\sum_{j \in I_{\leq i}} x_j \sum_{j \in I_{\leq i}} 1\right] + \bar{x}^2 \sum_{i \in I} \left(\sum_{j \in I_{\leq i}} 1\right)^2 =$$

$$SUMSQUAREDSUMS - 2\bar{x} * SUMCOUNTSUMS + \bar{x}^2 SUMSQUAREDCOUNTS$$

To compute the level-stationarity KPSS statistic, the instrumentation analysis system 100 uses the getLevelStatistic( ) function.

| Function 3 | getLevelStatistic( ) |

```
num = SUMSQUAREDSUMS - (2* SUM * SUMCOUNTSUMS /
COUNT) +
    (SUMSQUAREDCOUNTS * SUM * SUM) / (COUNT * COUNT)
den = COUNT * SUMSQUARES - SUM * SUM
return num / den
```

Computing the Trend-Stationarity Kpss Statistic

The instrumentation analysis system 100 (e.g., the computation module 330) uses an add process and a remove process similar to the above functions to increment and decrement the data values in the rolling window, update the set of tracked values, and subsequently calculate the trend-stationarity KPSS statistic based on the tracked values. Several additional tracked values are used for the trend-stationarity KPSS statistic. For the trend-stationarity KPSS statistic, the set of tracked values include the tracked values for the level-stationarity KPSS statistic described above, and, additionally, a sum squared sum sizes value, a sum sum by sum sizes value, a sum count by sum sizes value, and a sum sum sizes value. These values are referred to as SUMSQUAREDSIZES ($\Sigma_{i \in I}(\Sigma_{i \in I_{\leq i}} j)^2$), SUMSUMBYSUMSIZES ($\Sigma_{i \in I}[\Sigma_{j \in I_{\leq i}} x_j \Sigma_{j \in I_{\leq i}} j]$) SUMCOUNTBYSUMSIZES ($\Sigma_{i \in I}[\Sigma_{j \in I_{\leq i}} 1 \Sigma_{j \in I_{\leq i}} x]$), and SUMSUMSIZES ($\Sigma_{i \in I}(\Sigma_{j \in I_{\leq i}} j)$), respectively, where I denotes a subset of $\{1, \ldots, n\}$.

The below function addTrend(x) handles the logic of how to add a new data value x in the rolling window to the set of tracked values. The function addTrend(x) can be used as the add(x) function in the Prime and Stream algorithm provided above for the trend-stationarity KPSS statistic. Note that addTrend(x) relies on the addLevel(x) function; the set of tracked values for the level-stationarity KPSS statistic are updated according to the updates for the level-stationarity KPSS statistic as described above, and the four additional tracked values for the trend-stationarity KPSS statistic are then updated.

| Function 4 | addTrend(x) |

```
addLevel(x)
if x is not Null then
    SUMSQUAREDSUMSIZES += SUMSIZES * SUMSIZES
    SUMSUMBYSUMSIZES += SUM * SUMSIZES
    SUMCOUNTBYSUMSIZES += COUNT*SUMSIZES
    SUMSUMSIZES += SUMSIZES
```

The below function removeTrend(x) handles the logic of how to remove a trailing value in the rolling window from the set of tracked values. The function removeTrend(x) can be used as the remove(x) function in the Prime and Stream algorithm provided above for the trend-stationarity KPSS statistic. Note that removeTrend(x) relies on the removeLevel(x) function. The four additional tracked values for the trend-stationarity KPSS statistic are updated, and then the set of tracked values for the level-stationarity KPSS statistic are updated according to the updates for the level-stationarity KPSS statistic as described above.

| Function 5 | removeTrend(x) |

```
SUMSQUAREDSUMSIZES -=2 * SUMCOUNTBYSUMSIZES -
    SUMSQUAREDCOUNTS
SUMSUMBYSUMSIZES -= SUMCOUNTSUMS
SUMCOUNTBYSUMSIZES -= SUMSQUAREDCOUNTS
SUMSUMSIZES -= SUMCOUNTS
if x is not Null then
    SUMSUMBYSUMSIZES -= SUMSUMSIZES * x
    SUMCOUNTBYSUMSIZES -= SUMSUMSIZES
removeLevel(x)
```

The calculation of the trend-stationarity KPSS statistic also differs from the calculation and procedures for the level-stationarity KPSS statistic. For trend-stationarity, $e_j = x_j - (\hat{\beta}_0 + \hat{\beta}_1 j)$ denotes the difference between the jth observation and the jth fitted value. $S_i = \Sigma_{j=1}^{i} e_j$ denotes the partial sum of the first i residuals. The trend-stationarity KPSS statistic is calculated using the following formula:

$$\Sigma_{i \in I} S_i^2 / |I| \Sigma_{i \in I} e_i^2 \qquad (4)$$

The denominator of the trend-stationarity KPSS statistic is a product of the count value and the sum of the squared residuals, which is based on the intercept and the slope. $S_i^2$ of the numerator of the trend-stationarity KPSS statistic may expressed as the following equation:

$$S_i^2 = (\Sigma_{j \in I_{\leq i}} y_j)^2 + \hat{\beta}_0^2 (\Sigma_{j \in I_{\leq i}} 1)^2 + \hat{\beta}_1^2 (\Sigma_{j \in I_{\leq i}} j)^2 - 2\hat{\beta}_0 \Sigma_{j \in I_{\leq i}} y_j \Sigma_{j \in I_{\leq i}} 1 - 2\hat{\beta}_1 \Sigma_{j \in I_{\leq i}} y_j \Sigma_{j \in I_{\leq i}} j + 2\hat{\beta}_0 \hat{\beta}_1 \Sigma_{j \in I_{\leq i}} 1 \Sigma_{j \in I_{\leq i}} j \quad (5)$$

The numerator $\Sigma_{i \in I} S_i^2$ is a function of the slope and the intercept, as well as several of the tracked values: the sum squared sum sizes value, the sum sum by sum sizes value, and the sum count by sum sizes value. See Function 9, described below, for the equations used to calculate the numerator and denominator of the trend-stationarity KPSS statistic.

The slope and intercept are used to determine the sum of squared residuals. The below function getSlope( ) handles the logic of computing the slope of the time series.

| Function 6 | getSlope( ) |
|---|---|
| return (COUNT * WEIGHTEDSUM − SUMSIZES * SUM) / (COUNT * SUMSQUAREDSIZES − SUMSIZES * SUMSIZES) | |

The below function getIntercept( ) handles the logic of computing the intercept of the time series.

| Function 7 | getIntercept( ) |
|---|---|
| return (SUMSQUAREDSIZES * SUM − SUMSIZES * WEIGHTEDSUM) / (COUNT * SUMSQUAREDSIZES − SUMSIZES * SUMSIZES) | |

The below function getSumSquaredResiduals( ) returns the sum of the squared residuals for the KPSS statistic. This function relies on getSlope( ) and getIntercept( ). Function 9 uses getSumSquaredResiduals( ) to determine the trend-stationarity KPSS statistic.

| Function 8 | getSumSquaredResiduals( ) |
|---|---|
| a = getIntercept( ) <br> b = getSlope( ) <br> return COUNT * a * a + 2 * b * a * SUMSIZES + b * b * SUMSQUAREDSIZES − 2 * a * SUM − 2 * b * WEIGHTEDSUM + SUMSQUARES | |

To compute the trend-stationarity KPSS statistic, the instrumentation analysis system 100 uses the getTrendStatistic( ) function, which relies on the getIntercept( ), getSlope( ), and getSumSquaredResiduals( ) functions.

| Function 9 | getTrendStatistic( ) |
|---|---|
| a = getIntercept( ) <br> b = getSlope( ) <br> num = SUMSQUAREDSUMS − 2 * SUMCOUNTSUMS * a −2 * b * SUMSUMBYSUMSIZES + a * a * SUMSQUAREDCOUNTS + 2 * a * b * SUMCOUNTBYSUMSIZES <br> return num / (COUNT * getSumSquaredResiduals( )) | |

Examples of Using the KPSS Statistic on Signals

Figure 9:
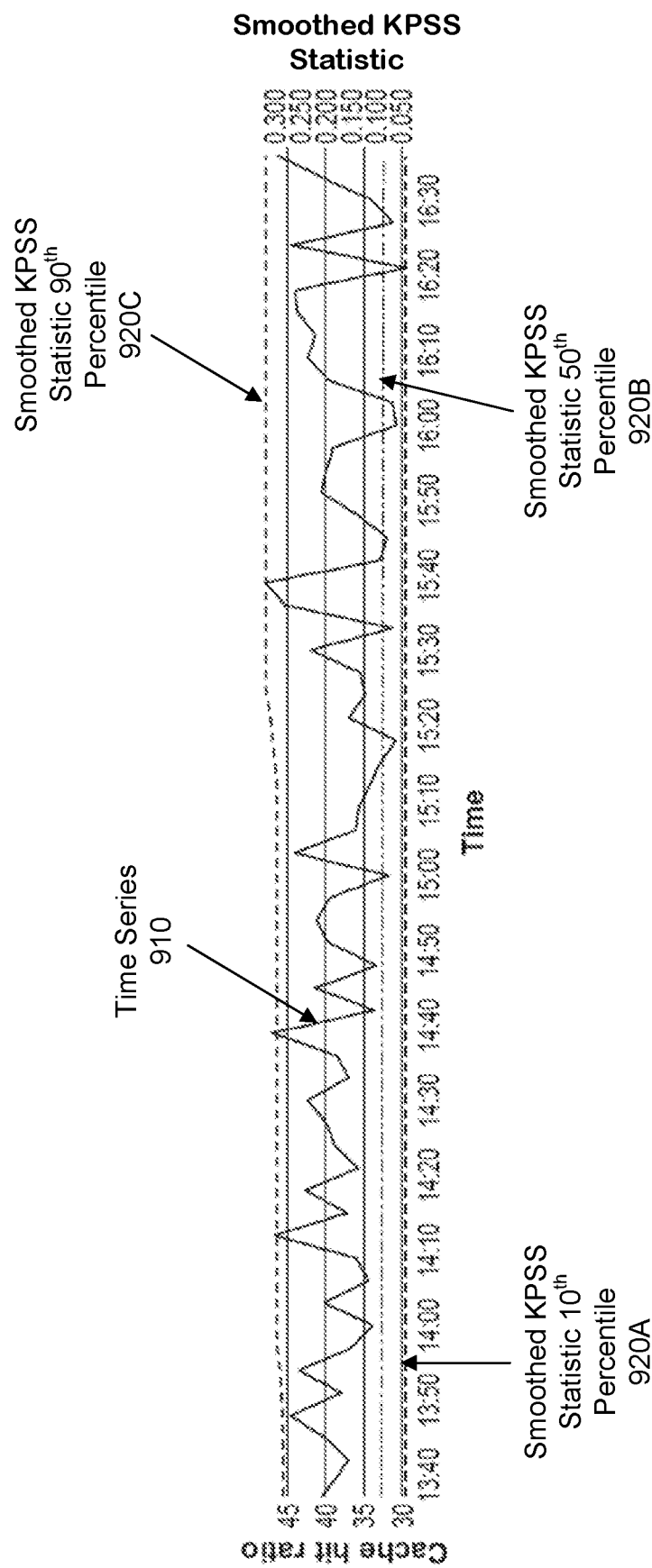
FIG. 9 shows an example of a stationary signal for a cache hit ratio, according to an embodiment.

FIG. 9 shows an example of a stationary signal for a cache hit ratio, according to an embodiment. The time series 910 includes data values from a cache hit ratio signal that was sampled and recorded every 3 minutes over the time period of 3 hours. The time series 910 is plotted against the left axis, or "Cache hit ratio." Though the data is only plotted for 3 hours, the KPSS statistic depends on the most recent 25 hours of data. The stationarity of the signal may be represented by the smoothed level-stationarity KPSS statistic 920 for various percentiles. In particular, the smoothed level-stationary KPSS statistic $50^{th}$ percentile 920B refers to the $50^{th}$ percentile of the 1 hour KPSS statistics and represents the stationarity of the signal over a 1 hour period. The smoothed KPSS statistic $90^{th}$ percentile 920C has a value of around 0.3, which indicates that over the previous 24 hours, the vast majority of the 1 hour periods of the signal had a KPSS statistic less than or equal to 0.3. This indicates that the signal for cache hit ratio is stationary.

The thresholds used to determine stationarity may depend on the number of data values in the rolling window. For a rolling window of 20 to 50 data points, example thresholds for the KPSS statistic are as follows: a time series with a KPSS statistic less than 0.6 may be considered stationary, and a time series with a KPSS statistic more than 1.0 may be considered non-stationary. A time series with a KPSS statistic more than 0.6 but less than 1.0 may be considered ambiguous, meaning it is unclear whether the time series has stationarity. In view of this, the signal of the time series 910 may be considered stationary for all smoothed KPSS statistic 920 percentiles. Since the signal is stationary, the instrumentation analysis system 100 may suggest, for example, a sudden change alert or a static threshold alert. A sudden change alert detects when recent values of the signal vary significantly from a large length of preceding values, such as when the values of the signal for the last 5 minutes vary greatly from the preceding hour of values of the signal. A static threshold alert uses a threshold for the signal based on prior experience or an analysis of the graph.

Figure 10:
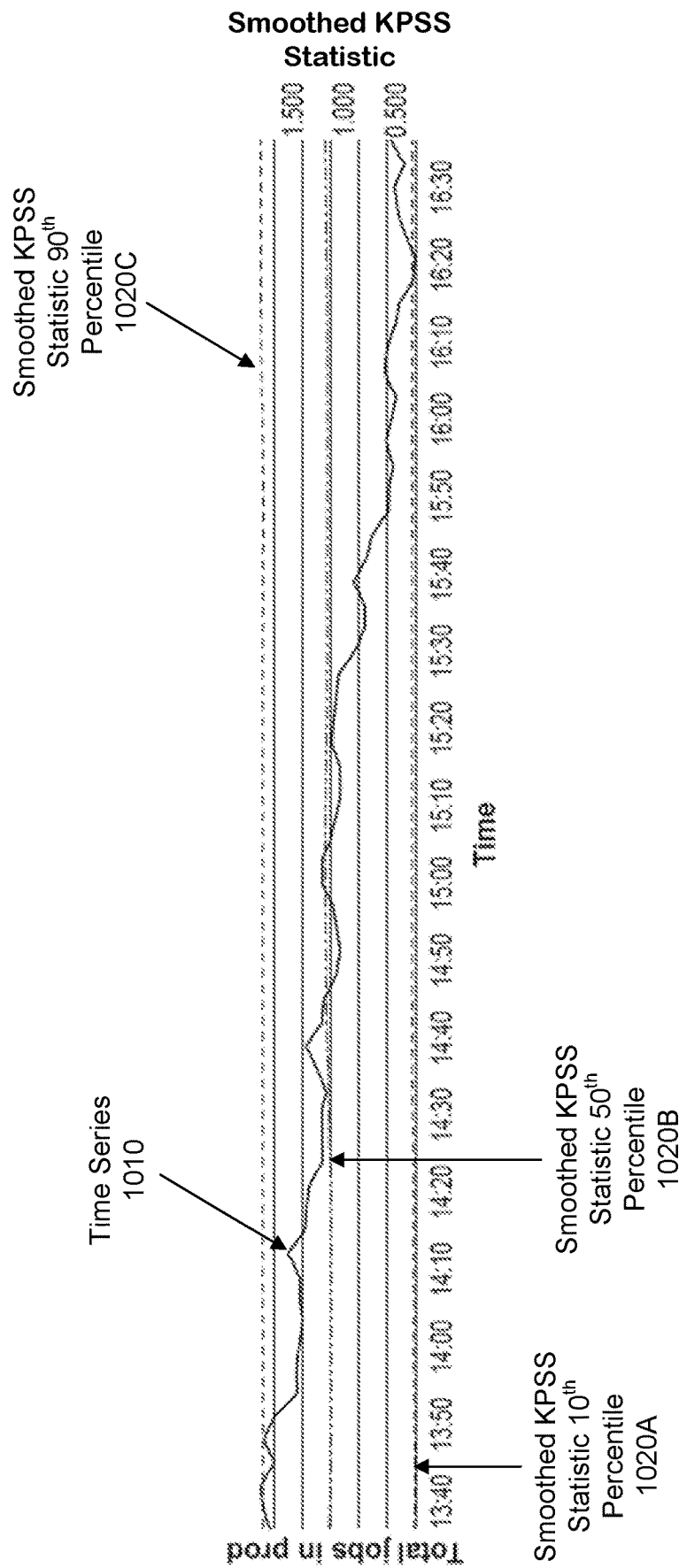
FIG. 10 shows an example of a non-stationary signal for a total number of jobs, according to one embodiment.

FIG. 10 shows an example of a non-stationary signal for a total number of jobs running across a production cluster, according to one embodiment. The time series 1010 includes data values from a total jobs signal that was sampled and recorded every 3 minutes over the time period of 3 hours. The data block 1010 is plotted against the left axis, or "Total jobs in prod." The stationarity of the signal may be represented by the smoothed KPSS statistic 1020 for various percentiles. The percentiles of the smoothed KPSS statistic 920 are plotted against the right axis. The smoothed KPSS statistic $50^{th}$ percentile 1020B refers to the $50^{th}$ percentile of the 1 hour KPSS statistics calculated over a 24 hour time period and represents the stationarity of the signal over a 1 hour period. The value of the smoothed KPSS statistic $50^{th}$ percentile 1020B is 1.0, indicating that a majority of the 1 hour periods of the signal do not exhibit level-stationarity. Based on the above example thresholds, the signal shown in FIG. 10 is not stationary.

Figure 11:
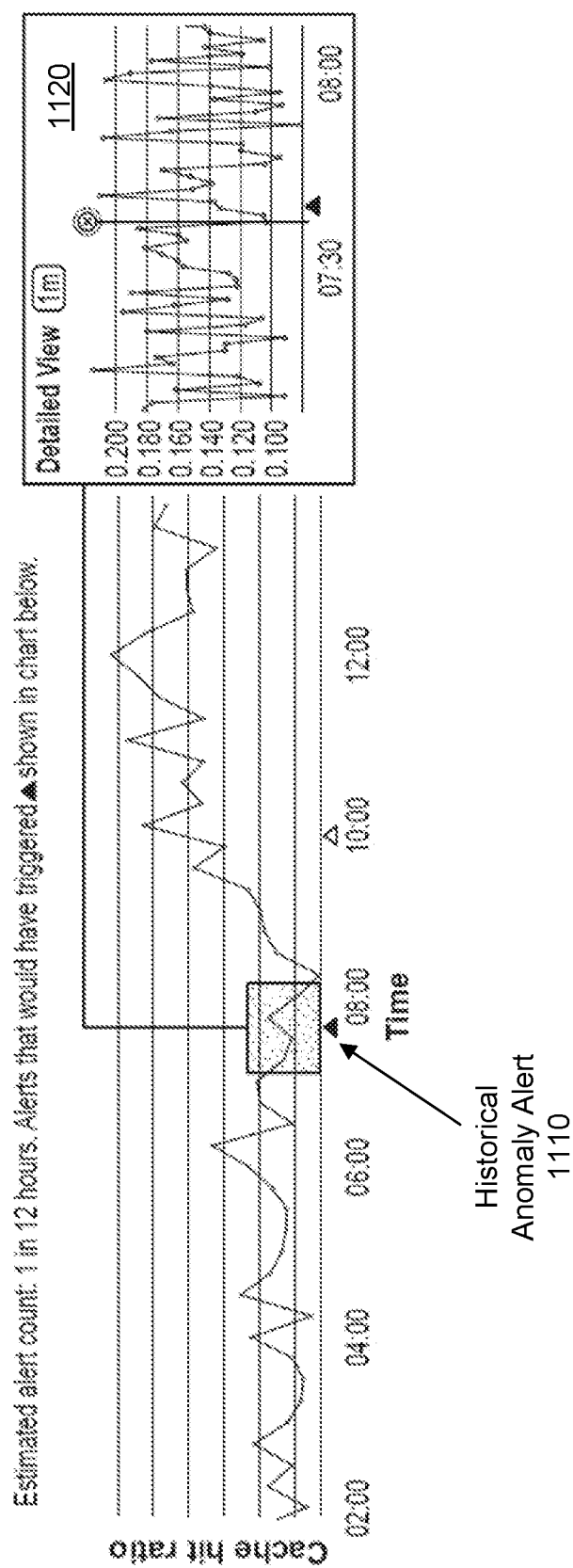
FIG. 11 shows alerts triggered for a cache hit ratio signal, according to an embodiment.

FIG. 11 shows an example of an alert triggered for a cache hit ratio signal, according to an embodiment. Only one alert, a historical anomaly alert 1110, was triggered over the 12-hour time period shown in FIG. 11. However, a detailed view 1120 of the signal around the time of the historical anomaly alert 1110 shows that the signal is relatively stationary; however, in this example, the signal was stationary around a different value in preceding weeks, which caused the alert to be triggered.

Figure 12:
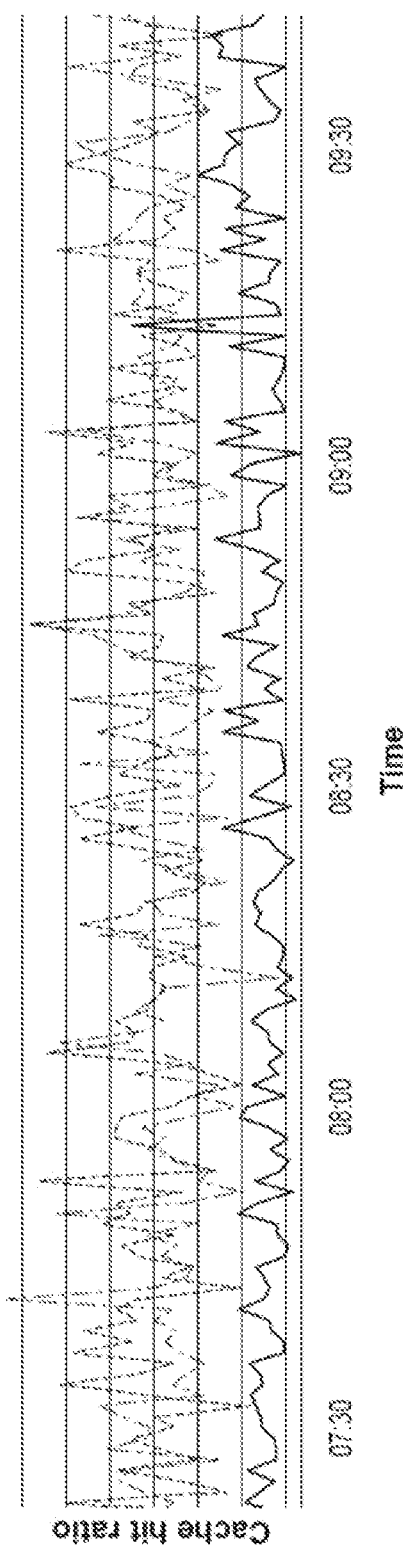
FIG. 12 shows a comparison of three time periods of the cache hit ratio signal of FIG. 11, according to an embodiment.

FIG. 12 shows a comparison of three time periods of the cache hit ratio signal of FIG. 11, according to an embodiment. FIG. 12 shows the signal over three time periods from the current week, as well as 1 and 2 weeks ago, in a time range that includes the time range of the detailed view 1120 shown in FIG. 11. As shown in this figure, the level of the signal changes over the three weeks. Due to the general character of the data, the recent history of the signal may be more predictive of the present than data from the previous 3 weeks. Thus, an alert selected for a stationary signal would be more appropriate than the historical anomaly alert. By using the level-stationary KPSS statistic described above, the instrumentation analysis system 100 can automatically select an appropriate alerting scheme, or suggest a different alerting scheme to a developer.

Figure 13:
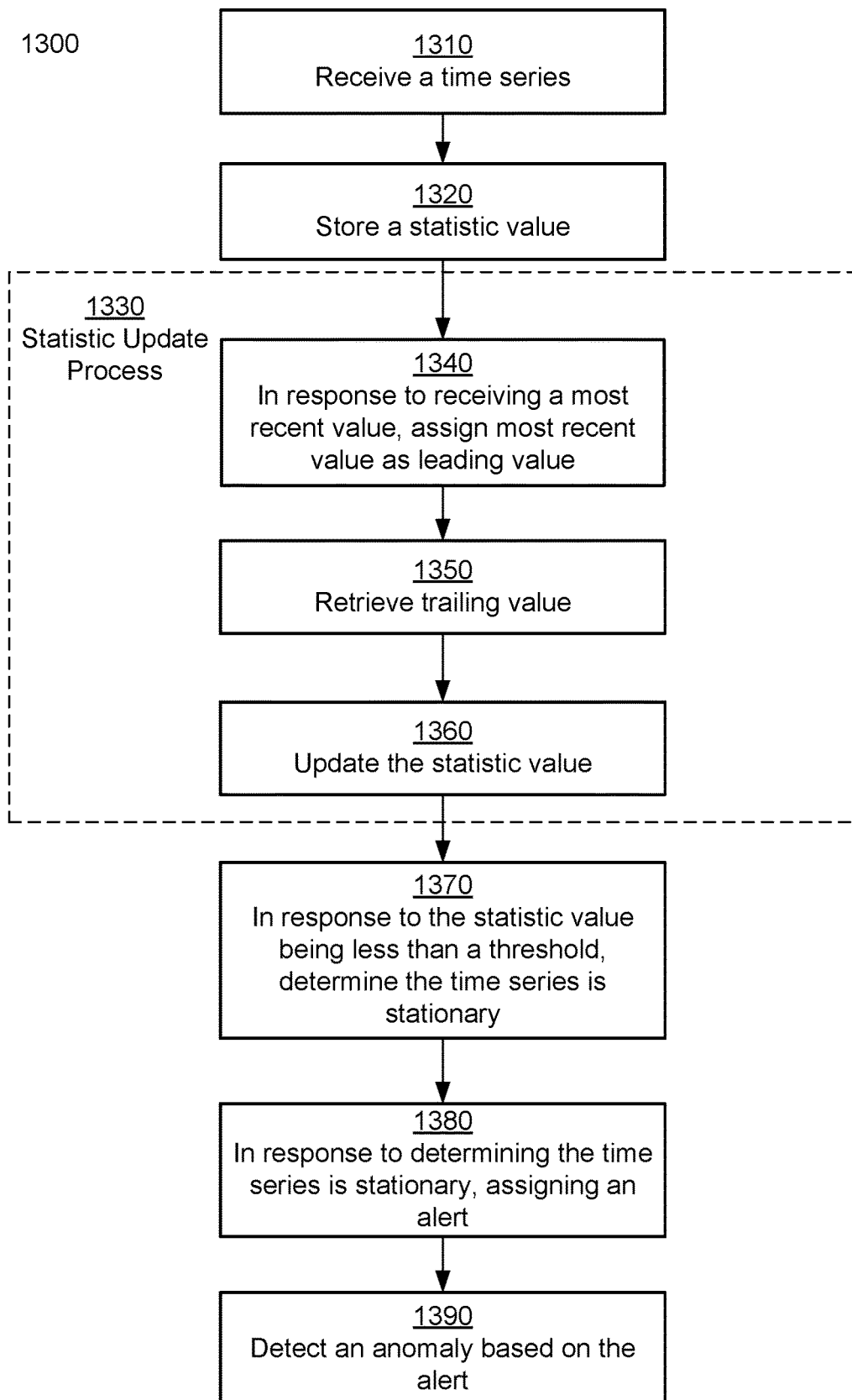
FIG. 13 shows a flowchart for the process of detecting an anomaly using the KPSS statistic, according to an embodiment.

FIG. 13 shows a flowchart 1300 for the process of selecting an alert using a KPSS statistic, referred to as a statistic value, and using the selected alert for detecting an anomaly, according to an embodiment. The instrumentation analysis system 100 receives 1310 a time series. The time series comprises a plurality of data values from an instance of instrumented software executing on an external computing system. The time series may be a signal indicating computing usage on the external computing system. Each of the plurality of data values corresponds to a metric describing a characteristic of the computing system that changes over time.

The instrumentation analysis system 100 stores 1320 a statistic value that represents the current stationarity of the time series based on data values of the plurality of data values for the time series in a window. The window has a leading value and a trailing value, and the statistic value is computed based on normalized partial sums of residual values. In one embodiment, the statistic value is computed for level-stationarity. The statistic value can additionally or alternatively be computed for trend-stationarity.

In response to receiving a most recent value of the plurality of data values in the time series, the instrumentation analysis system 100 performs a statistic update process 1330 to update the statistic based on the most recent value. The statistic update process may be performed in real time each time a new data value is received. During the statistic update process 1330, the instrumentation analysis system 100 assigns 1340 the most recent value as the leading value in the window, and retrieves 1350 the trailing value of the window. The instrumentation analysis system 100 updates 1360 the statistic value to add an influence of the most recent value and remove an influence of the trailing value on the statistic value. The instrumentation analysis system 100 may use the functions described for level-stationarity and trend-stationarity to increment, decrement, and compute the KPSS statistic.

In response to the statistic value being less than a threshold, the instrumentation analysis system 100 determines 1370 that the time series is stationary. In response to determining the time series is stationary, the instrumentation analysis system 100 assigns 1380 an alert for a stationary data stream to the metric from a plurality of possible alerts. The instrumentation analysis system 100 may automatically assign the alert to the data stream, or the instrumentation analysis system 100 may suggest an alert to a developer, and the developer selects to assign the alert to the data stream. The instrumentation analysis system 100 detects 1390 an anomaly in the metric based on the assigned alert.

Alternative Embodiments

It is to be understood that the Figures and descriptions of the present invention have been simplified to illustrate elements that are relevant for a clear understanding of the invention, while eliminating, for the purpose of clarity, many other elements found in a typical system. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for generating reports based on instrumented software through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for detecting an anomaly in a metric for a computing system, the method comprising:
    receiving a time series comprising a plurality of data values from an instance of instrumented software executing on an external computing system, each of the plurality of data values corresponding to a metric describing a characteristic of the computing system that changes over time;
    storing a statistic value representing a current stationarity of the time series based on data values of the plurality of data values for the time series in a window, the window having a leading value and a trailing value, wherein the statistic value is computed based on normalized partial sums of residual values;
    in response to receiving a most recent value of the plurality of data values in the time series:
        assigning the most recent value as the leading value in the window; retrieving the trailing value of the window; and
        updating the statistic value to add an influence of the most recent value and remove an influence of the trailing value;
    in response to the statistic value being less than a threshold, determining that the time series is stationary;
    in response to determining that the time series is stationary, assigning an alert for a stationary data stream to the metric; and
        detecting an anomaly in the metric based on the assigned alert,
        wherein the statistic value represents a normalized series of partial sums of residual values in a series of residual values, the residual values is a difference of the mean and each data value of the time series, and each partial sum of the series of partial sums is a summation of a corresponding residual value and residual values that occur before the corresponding residual value in the series of residual values.

2. The method of claim 1, further comprising:
    storing a plurality of tracked values determined based on data values in the window; and
    in response to receiving the most recent value of the plurality of data values in the time series, updating the plurality of tracked values to add an influence of the most recent value and remove an influence of the trailing value,
    wherein updating the statistic value to add an influence of the most recent value and remove an influence of the trailing value comprises determining the statistic value based on the plurality of tracked values.

3. The method of claim 2, wherein the plurality of tracked values comprise a count value, a sum value, a sum squares value, a weighted sum value, a sum sizes value, and a sum squared size value.

4. The method of claim 3, wherein determining the statistic value based on the plurality of tracked values comprises:
    determining a sum squared sums value, a sum count sums value, and a sum squared counts value based on the plurality of tracked values;
    determining a numerator of the statistic value based on the sum squared sums value, the sum value, the sum count sums value, the count value, and the sum squared counts value;
    determining a denominator of the statistic value based on the count value, the sum squares value, and the sum value.

5. The method of claim 1, wherein the statistic value being greater than a second threshold indicates that the time series is not stationary, and the statistic value being greater than the threshold but less than the second threshold indicates that the stationarity of the time series is ambiguous.

6. The method of claim 1, further comprising, during a priming phase:
    adding data values to the time series, the number of added data values the same as the length of the window; and
    updating the statistic value to add influences of the added data values without removing influences of data values in the time series.

7. The method of claim 1, wherein the statistic value represents whether the time series is level stationary, wherein the time series is level stationary if the time series is stationary around a mean of the time series.

8. The method of claim 1, wherein the statistic value represents whether the time series is trend stationary, wherein the time series is trend stationary if the time series is stationary around a linear trend.

9. The method of claim 8, wherein determining the statistic value based on the plurality of tracked values comprises:
    determining a plurality of tracked values comprising a count value, a sum squared sums value, a sum count sums value, a sum squared counts value, a sum squared sum sizes value, a sum sum by sum sizes value, a sum count by sum sizes value, and sum squared residual values from the tracked values;
    determining an intercept and a slope for the linear trend based on the count value, the weighted sum value, the sum sizes value, the sum value, and the sum squared size value;
    determining sum squared residual values based on the intercept, the slope, the sum sizes value, the sum squared size value, the sum value, the weighted sum value, and the sum squares value;
    determining a numerator of the statistic value based on the sum squared sums value, the sum value, the sum sum by sum sizes value, the sum squared counts value, the sum count by sum sizes value, the sum squared sum sizes value, the intercept, and the slope;
    determining a denominator of the statistic value based on the count value and the sum squared residual values.

10. A non-transitory computer-readable storage medium comprising instructions executable by a processor, the instructions comprising:
    instructions for receiving a time series comprising a plurality of data values from an instance of instrumented software executing on an external computing system,
        each of the plurality of data values corresponding to a metric describing a characteristic of the computing system that changes over time;
    instructions for storing a statistic value representing a current stationarity of the time series based on data values of the plurality of data values for the time series in a window, the window having a leading value and a trailing value, wherein the statistic value is computed based on normalized partial sums of residual values;

in response to receiving a most recent value of the plurality of data values in the time series, instructions for:
assigning the most recent value as the leading value in the window; retrieving the trailing value of the window; and
updating the statistic value to add an influence of the most recent value and remove an influence of the trailing value;
in response to the statistic value being less than a threshold, instructions for determining that the time series is stationary;
in response to determining that the time series is stationary, instructions for assigning an alert for a stationary data stream to the metric; and
instructions for detecting an anomaly in the metric based on the assigned alert,
wherein the statistic value represents a normalized series of partial sums of residual values in a series of residual values, the residual values is a difference of the mean and each data value of the time series, and each partial sum of the series of partial sums is a summation of a corresponding residual value and residual values that occur before the corresponding residual value in the series of residual values.

11. The non-transitory computer-readable storage medium of claim 10, further comprising:
instructions for storing a plurality of tracked values determined based on data values in the window; and in response to receiving the most recent value of the plurality of data values in the time series, instructions for updating the plurality of tracked values to add an influence of the most recent value and remove an influence of the trailing value,
wherein updating the statistic value to add an influence of the most recent value and remove an influence of the trailing value comprises determining the statistic value based on the plurality of tracked values.

12. The non-transitory computer-readable storage medium of claim 11, wherein the plurality of tracked values comprise a count value, a sum value, a sum squares value, a weighted sum value, a sum sizes value, and a sum squared size value.

13. The non-transitory computer-readable storage medium of claim 12, wherein determining the statistic value based on the plurality of tracked values comprises:
instructions for determining a sum squared sums value, a sum count sums value, and a sum squared counts value based on the plurality of tracked values;
instructions for determining a numerator of the statistic value based on the sum squared sums value, the sum value, the sum count sums value, the count value, and the sum squared counts value;
instructions for determining a denominator of the statistic value based on the count value, the sum squares value, and the sum value.

14. The non-transitory computer-readable storage medium of claim 10, wherein the statistic value being greater than a second threshold indicates that the time series is not stationary, and the statistic value being greater than the threshold but less than the second threshold indicates that the stationarity of the time series is ambiguous.

15. The non-transitory computer-readable storage medium of claim 10, further comprising, during a priming phase:
instructions for adding data values to the time series, the number of added data values the same as the length of the window; and
instructions for updating the statistic value to add influences of the added data values without removing influences of data values in the time series.

16. The non-transitory computer-readable storage medium of claim 10, wherein the statistic value represents whether the time series is level stationary, wherein the time series is level stationary if the time series is stationary around a mean of the time series.

17. The non-transitory computer-readable storage medium of claim 10, wherein the statistic value represents whether the time series is trend stationary, wherein the time series is trend stationary if the time series is stationary around a linear trend.

18. A computer system comprising:
a computer processor; and
a non-transitory computer-readable storage medium storage instructions that when executed by the computer processor perform actions comprising:
receiving a time series comprising a plurality of data values from an instance of instrumented software executing on an external computing system, each of the plurality of data values corresponding to a metric describing a characteristic of the computing system that changes over time;
storing a statistic value representing a current stationarity of the time series based on data values of the plurality of data values for the time series in a window, the window having a leading value and a trailing value, wherein the statistic value is computed based on normalized partial sums of residual values;
in response to receiving a most recent value of the plurality of data values in the time series:
assigning the most recent value as the leading value in the window; retrieving the trailing value of the window; and
updating the statistic value to add an influence of the most recent value and remove an influence of the trailing value;
in response to the statistic value being less than a threshold, determining that the time series is stationary;
in response to determining that the time series is stationary, assigning an alert for a stationary data stream to the metric; and
detecting an anomaly in the metric based on the assigned alert,
wherein the statistic value represents a normalized series of partial sums of residual values in a series of residual values, the residual values is a difference of the mean and each data value of the time series, and each partial sum of the series of partial sums is a summation of a corresponding residual value and residual values that occur before the corresponding residual value in the series of residual values.

* * * * *